(12) United States Patent
Munetomo

(10) Patent No.: US 8,405,842 B2
(45) Date of Patent: Mar. 26, 2013

(54) IMAGE FORMING SYSTEM HAVING USE RESTRICTION FUNCTION BASED ON DOCUMENT FORMAT TO BE PRINTED AND USE RESTRICTION METHOD IN THE SYSTEM

(75) Inventor: Hiroki Munetomo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 909 days.

(21) Appl. No.: 12/460,411

(22) Filed: Jul. 16, 2009

(65) Prior Publication Data

US 2010/0014110 A1    Jan. 21, 2010

(30) Foreign Application Priority Data

Jul. 17, 2008  (JP) ................. 2008-186160

(51) Int. Cl.
*G06K 15/00* (2006.01)
*G06F 3/12* (2006.01)

(52) U.S. Cl. ..................... 358/1.14; 358/1.13

(58) Field of Classification Search .................. 358/1.1, 358/1.8, 1.13, 1.14, 1.15, 1.16, 1.18, 526; 382/181, 182, 183, 192, 193; 399/28, 43, 399/50, 77, 366
See application file for complete search history.

(56) References Cited

U.S. PATENT DOCUMENTS

| | | | |
|---|---|---|---|
| 7,587,468 B2 * | 9/2009 | Tenenbaum ................. | 709/217 |
| 2003/0161002 A1 | 8/2003 | Nishiwaki et al. | |
| 2006/0126095 A1 | 6/2006 | Tamura et al. | |
| 2007/0172281 A1 | 7/2007 | Inoue et al. | |
| 2007/0273923 A1 | 11/2007 | Kimura | |
| 2008/0106754 A1 | 5/2008 | Oomori | |

FOREIGN PATENT DOCUMENTS

| | | |
|---|---|---|
| JP | 7-038747 A | 2/1995 |
| JP | 2000-322219 A | 11/2000 |
| JP | 2001-071604 A | 3/2001 |
| JP | 2003-348279 A | 12/2003 |
| JP | 2004-227530 A | 8/2004 |
| JP | 2005-322104 A | 11/2005 |
| JP | 2005-354401 A | 12/2005 |
| JP | 2006-166155 A | 6/2006 |
| JP | 2007-160889 A | 6/2007 |
| JP | 2007-230013 A | 9/2007 |
| JP | 2008-060717 A | 3/2008 |
| JP | 2008-123058 A | 5/2008 |
| JP | 2008-139912 A | 6/2008 |
| JP | 2008-225631 A | 9/2008 |
| WO | WO 01/97504 A1 | 12/2001 |

* cited by examiner

*Primary Examiner* — Gabriel Garcia
(74) *Attorney, Agent, or Firm* — Edwards Wildman Palmer LLP; David G. Conlin; David A. Tucker

(57) ABSTRACT

An image forming system includes: a data receiving unit for receiving data to be printed and an identifier of a user who demanded printing of the data; a determining unit for determining whether or not a document represented by the data received by the data receiving unit is in accordance with a predetermined format; and a print controller for permitting or restricting printing of the data, depending on the result of determination by the determining unit.

11 Claims, 18 Drawing Sheets

| DAY/<br>TIME SLOT | 0:00-<br>7:00 | 7:00-<br>9:00 | 9:00-<br>12:00 | 12:00-<br>13:00 | 13:00-<br>17:00 | 17:00-<br>21:00 | 21:00-<br>0:00 |
|---|---|---|---|---|---|---|---|
| SUN | PROHIBITED | PROHIBITED | PROHIBITED | PROHIBITED | PROHIBITED | PROHIBITED | PROHIBITED |
| MON | PROHIBITED | PERMITTED | PERMITTED | PROHIBITED | PERMITTED | PROHIBITED | PROHIBITED |
| TUE | PROHIBITED | PERMITTED | PERMITTED | PROHIBITED | PERMITTED | PERMITTED | PROHIBITED |
| WED | PROHIBITED | PERMITTED | PERMITTED | PROHIBITED | PERMITTED | PERMITTED | PROHIBITED |
| THU | PROHIBITED | PERMITTED | PERMITTED | PROHIBITED | PERMITTED | PERMITTED | PROHIBITED |
| FRI | PROHIBITED | PERMITTED | PERMITTED | PROHIBITED | PERMITTED | PERMITTED | PROHIBITED |
| SAT | PROHIBITED | PERMITTED | PERMITTED | PROHIBITED | PROHIBITED | PROHIBITED | PROHIBITED |

FIG.9

| USER ID | DAY/ TIME SLOT | 0:00– 7:00 | 7:00– 9:00 | 9:00– 12:00 | 12:00– 13:00 | 13:00– 17:00 | 17:00– 21:00 | 21:00– 0:00 | WATERMARK | COLOR PRINT |
|---|---|---|---|---|---|---|---|---|---|---|
| USER 1 | SUN | PROHIBITED | PROHIBITED | PROHIBITED | PROHIBITED | PROHIBITED | PROHIBITED | PROHIBITED | SUPERPOSE ONLY IN PROHIBITED TIME SLOT | BLACK & WHITE ONLY |
| | MON | PROHIBITED | PERMITTED | PERMITTED | PROHIBITED | PERMITTED | PROHIBITED | PROHIBITED | | |
| | TUE | PROHIBITED | PERMITTED | PERMITTED | PROHIBITED | PERMITTED | PERMITTED | PROHIBITED | | |
| | WED | PROHIBITED | PERMITTED | PERMITTED | PROHIBITED | PERMITTED | PERMITTED | PROHIBITED | | |
| | THU | PROHIBITED | PERMITTED | PERMITTED | PROHIBITED | PERMITTED | PERMITTED | PROHIBITED | | |
| | FRI | PROHIBITED | PERMITTED | PERMITTED | PROHIBITED | PERMITTED | PERMITTED | PROHIBITED | | |
| | SAT | PROHIBITED | PERMITTED | PERMITTED | PROHIBITED | PROHIBITED | PROHIBITED | PROHIBITED | | |
| USER 2 | SUN | PROHIBITED | PROHIBITED | PROHIBITED | PROHIBITED | PROHIBITED | PROHIBITED | PROHIBITED | NO SUPERPOSE IN EVERY TIME SLOT | BOTH COLOR AND BLACK & WHITE |
| | MON | PROHIBITED | PERMITTED | PERMITTED | PERMITTED | PERMITTED | PERMITTED | PERMITTED | | |
| | TUE | PROHIBITED | PERMITTED | PERMITTED | PERMITTED | PERMITTED | PERMITTED | PERMITTED | | |
| | WED | PROHIBITED | PERMITTED | PERMITTED | PERMITTED | PERMITTED | PERMITTED | PERMITTED | | |
| | THU | PROHIBITED | PERMITTED | PERMITTED | PERMITTED | PERMITTED | PERMITTED | PERMITTED | | |
| | FRI | PROHIBITED | PERMITTED | PERMITTED | PERMITTED | PERMITTED | PERMITTED | PERMITTED | | |
| | SAT | PROHIBITED | PERMITTED | PERMITTED | PERMITTED | PERMITTED | PERMITTED | PROHIBITED | | |

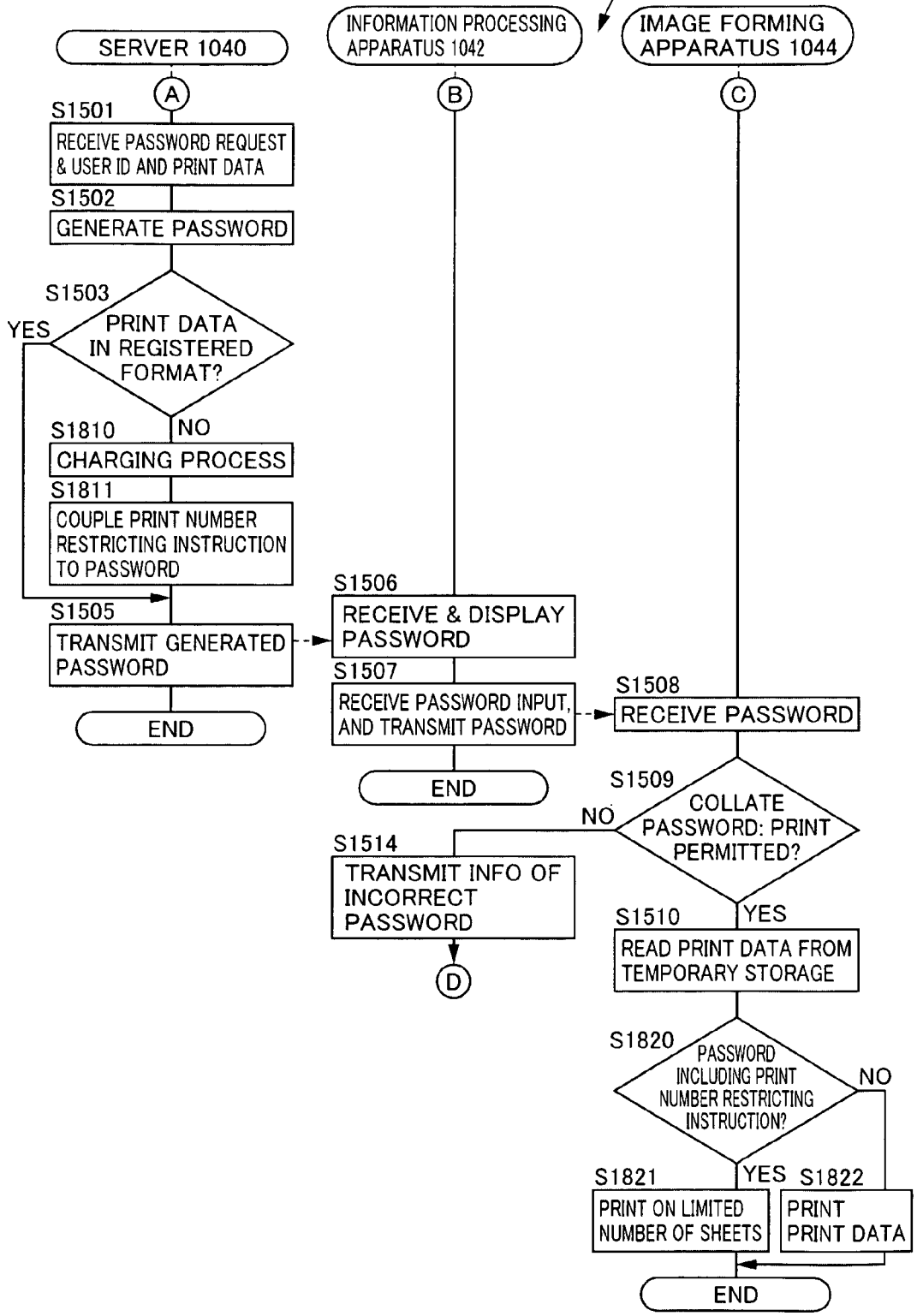

IMAGE FORMING SYSTEM HAVING USE RESTRICTION FUNCTION BASED ON DOCUMENT FORMAT TO BE PRINTED AND USE RESTRICTION METHOD IN THE SYSTEM

CROSS-REFERENCE TO RELATED APPLICATION

This nonprovisional application claims priority under 35 U.S.C. §119(a) on Patent Application No. 2008-186160 filed in Japan on Jul. 17, 2008, the entire contents of which are hereby incorporated by reference.

BACKGROUND OF THE INVENTION

1. Field of the Invention

The present invention relates to an image forming system handling image data and, more specifically, to an image forming system having a use restriction function for a user.

2. Description of the Background Art

Currently, image forming apparatuses such as digital copy machines and printers are very common everywhere and indispensable at worksites using computers. Recently, image forming apparatuses having color-printing function are also increased and in widespread use.

At the same time, abuse such as private use other than for business purpose comes to pose a problem. Abuse is problematic because it is difficult to identify who did it, and because it is hard to keep a close check on private use, which is often made after business hours. Abuse of color printing is particularly a big problem, as its unit cost is high and use other than business purpose incurs burden of expense.

In connection with this problem, Japanese Patent Laying-Open No. 2003-348279 (hereinafter referred to as "'279 application") discloses a technique of imposing use restriction user by user, in which if one makes an attempt to use an image forming apparatus during off-hours, a warning display appears and the operation is stopped. According to the technique disclosed in '279 application, in the image forming apparatus, a user ID, a function or functions (including color-copying function) permitted for each user ID, available hours for the permitted functions, available hours of the image forming apparatus itself and so on are registered beforehand. The image forming apparatus receives an input of user ID, and performs user authentication and function restriction user by user. If one tries to use the image forming apparatus during off-hours, a warning display is given and the operation is stopped.

The technique of '279 stops operation and, if use is necessary before or after available hours, one must request an administrator for a change of permitted hours in advance and have the hours changed accordingly. This leads to another problem that emergency use of the apparatus at night or on holidays is impossible.

In this regard, Japanese Patent Laying-Open No. 2007-230013 (hereinafter referred to as "'013 application") discloses a technique directed to an image forming apparatus in which even when print restriction is set in advance for each user, the print restriction is cancelled temporarily by a user operation to allow printing.

Further, management of documents to be printed is also a major security concern.

Japanese Patent Laying-Open No. 2007-160889 (hereinafter referred to as "'889 application") discloses a technique of issuing a one-time password valid for only one print job. By inputting the issued password, a user can obtain output of a designated print job. The issued one-time password is valid only for one print job designated by the user and, even if the password is leaked or lost after the end of printing, printing of the document can be prevented. As a result, ill-intentioned printing resulting from password leakage can be prevented.

From the viewpoint of preventing abuse of image forming apparatus, the technique of user authentication and setting of available time for permitting use is effective. Restricting the use of image forming apparatus only by time, however, is in many regards disadvantageous, considering business after hours at offices. Particularly, if the user is trying hard to meet the deadline and the image forming apparatus should become unavailable just before the finish, it would significantly affect the business. Therefore, it is an important issue to prevent private use of the image forming apparatus while not negatively affecting business operations.

In the technique disclosed in '279 application, for use before or after hours, one must ask an administrator to change the available time. Therefore, it is inadequate in case of emergency at night or on a holiday, and it cannot solve the problem.

The technique disclosed in '013 application temporarily cancels print restriction in response to an operation by the user. This technique, however, allows cancellation of use restriction also at the time of non-emergency, which means that abuse is possible. Thus, it cannot solve the problem.

Further, private use of the image forming apparatus possibly leads to leakage of information to the outside. Prevention of private use is, therefore, a serious issue also from the viewpoint of information management.

The technique disclosed in '889 application is directed to issuance of a password for printing a document and, therefore, it cannot solve problems related to document and information management.

SUMMARY OF THE INVENTION

Therefore, an object of the present invention is to provide an image forming system that can prevent private use without negatively affecting business operations related to use of the image forming system.

According to a first aspect, the present invention provides an image forming system, including: a data receiving unit for receiving data to be printed and an identifier of a user demanding printing of the data; a first determining unit for determining whether or not a document represented by the data received by the data receiving unit is in accordance with a predetermined format; and a print controller for permitting or restricting printing of the data, depending on the result of determination by the first determining unit.

The data receiving unit receives data to be printed and the identifier of the user who demanded printing of the data. The first determining unit determines whether or not the document represented by the data received by the data receiving unit is in accordance with a predetermined format. The print controller permits or restricts data printing depending on the result of determination by the first determining unit.

Printing of data is permitted or restricted depending on whether the document represented by the received data is in accordance with a predetermined format or not. Specifically, the print operation is permitted or restricted depending on the contents of data. Therefore, printing of data in personal format different from the predetermined format can be restricted.

As a result, an image forming system that can prevent private use without negatively affecting business operations related to use of the image forming system can be provided.

Preferably, the print controller includes a print permitting unit for permitting, if it is determined by the first determining unit that the data is in accordance with the format, printing of the data, and a print restricting unit for permitting, if it is determined by the first determining unit that the data is not in accordance with the format, printing of only a part of the data.

If the data is determined to be in accordance with the format, printing thereof is permitted, and if determined not in accordance with the format, printing of only a part of the data is permitted. When the print data is not in accordance with the format, full printing of the data is unavailable. Therefore, abusive private printing by a user can be prevented. On the other hand, partial printing is possible and, therefore, the print is not fully wasteful for the user.

Preferably, the print controller includes a print permitting unit for permitting, if it is determined by the first determining unit that the data is in accordance with the format, printing of the data, and a charging unit for charging, if it is determined by the first determining unit that the data is not in accordance with the format, a prescribed fee to a user corresponding to the identifier, for printing the data.

If the print data is determined not to be in accordance with the format, the image forming system prints data after charging the user a prescribed fee. As a result, it is possible for the user to cancel the use restriction by himself/herself while private use of the image forming system is restricted.

Preferably, the image forming system further includes a report forming unit, responsive to a determination by the first determining unit that the document represented by the data is not in accordance with the format, for forming a print result report including a thumbnail of the document represented by the data.

As the printing result report is formed, it becomes possible to confirm the image of document represented by the data that is determined not to be in accordance with the format. Using the formed report, the user may ask the administrator additional registration of a format necessary for business.

Preferably, the image forming system further includes a reading unit for reading user identification information from a storage medium storing the user identification information. The print controller includes a permitting unit for permitting, if it is determined by the first determining unit that the data is in accordance with the format, printing of the data, an information reading unit, responsive to a determination by the first determining unit that the document represented by the data is not in accordance with the format, for reading the user identification information using the reading unit, and an operation controller for permitting or restricting printing of the data depending on whether the identification information read by the information reading unit and the identifier of the user who demanded printing of the data satisfy a prescribed relation or not.

If the document represented by the print data is determined not to be in accordance with the format, printing of the data is permitted or restricted using an identifier of the user who demanded data printing and identification information read by the reading means from the storage medium. When print data not in accordance with a format, that is, data not used for business operations is to be printed, user authentication is done using identification information. Therefore, printing not by a registered user can be prevented.

Preferably, the image forming system further includes a second determining unit for determining, for each user, whether printing in only a first number of colors is permitted, or printing in the first number of colors and in a second number of colors larger than the first number of colors are both permitted. The print controller includes a print permitting unit for permitting, if it is determined by the first determining unit that the data is in accordance with the format, printing of the data, and a print color controller for permitting, if it is determined by the first determining unit that the data is not in accordance with the format, printing of the data within the number of colors in accordance with the result of determination by the second determining unit.

In the image forming system the number of colors usable at the time of printing can be set user by user. As a result, expensive color printing can be limited for private printing and, therefore, printing supplies can be saved.

Preferably, the image forming system further includes a storage unit storing a print management table storing time conditions for permitting printing. The print controller includes a second determining unit for determining whether or not time at which printing of the data is demanded matches time conditions recorded in the print management table; and a print time controller for permitting or restricting printing of the data depending on a combination of the result of determination by the first determining unit and the result of determination by the second determining unit.

Time conditions for permitting printing are set, and printing of data is permitted or prohibited based on the time when data printing is requested and the document represented by the data. As the time conditions are set, it is possible, for example, to restrict data printing before or after available hours when there are few suspicious eyes.

Preferably, the print management table records, user by user, time conditions for permitting printing. The second determining unit includes a user-by-user time controller for determining whether or not the time at which printing of the data is demanded matches time conditions recorded in the print management table in correspondence with the identifier of the user who demanded printing of the data.

Other than the time conditions common to the users, user-by-user time conditions for permitting printing are set. Therefore, detailed setting of user permission matching the state of use by the user can be realized.

More preferably, the print management table further records, user by user, an instruction as to whether a prescribed change is to be made on a print image, if the time condition recorded for the user is not satisfied. The print time controller includes a printer for permitting printing of the data, or for printing the data after making a change in accordance with an instruction recorded in the print management table in correspondence with the identifier of the user who demanded printing of the data, depending on a combination of the result of determination by the first determining unit and the result of determination by the second determining unit.

More preferably, the change is a process of superposing a visible image prepared in advance on the data.

Preferably, the visible image is an image including a character sequence indicating that it is before or after print available time slot.

An instruction for adding or not adding a prescribed change to the print image if time conditions recorded user by user are not satisfied, is recorded on the print management table. The prescribed change includes, for example, superposing of a visible image prepared beforehand. As the print image is changed, it is made apparent that the print instruction was issued before or after the print-permitted hours and, therefore, printing not satisfying time conditions can be deterred.

According to a second aspect, the present invention provides a method of restricting use of an image forming system implemented by a computer, including: the data receiving step of receiving data to be printed and an identifier of a user demanding printing of the data; the first determining step of determining whether or not a document represented by the data received by the data receiving unit is in accordance with a predetermined format; and the print control step of permitting or restricting printing of the data, depending on the result of determination at the first determining step.

Preferably, the print control step includes the print permitting step of permitting, if it is determined at the first determining step that the data is in accordance with the format, printing of the data, and the print restricting step of permitting, if it is determined at the first determining step that the data is not in accordance with the format, printing of only a part of the data.

Preferably, the print control step includes the print permitting step of permitting, if it is determined at the first determining step that the data is in accordance with the format, printing of the data, and the charging step of charging, if it is determined by the first determining step that the data is not in accordance with the format, a prescribed fee to a user corresponding to the identifier, for printing the data.

Preferably, the method of restricting use of the image forming system further includes the storage step of storing a print management table storing time conditions for permitting printing. The print controlling step includes the second determining step of determining whether or not time at which printing of the data is demanded matches time conditions recorded in the print management table, and the print time controlling step of permitting or restricting printing of the data depending on a combination of the result of determination by the first determining unit and the result of determination by the second determining unit.

As described above, in the image forming system, depending on the determination as to whether the document represented by the received data is in accordance with a predetermined format or not, printing of the data is permitted or restricted. As the printing is permitted or restricted based on the contents represented by the data, it is possible to restrict printing of private data having a format different from the predetermined format. As a result, an image forming system that can prevent private use without negatively affecting business operations related to use of the image forming system can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of an available time slot management table 86 for image forming apparatus 44.

FIG. 9 shows a user-by-user function setting table 200, recording exemplary user-by-user setting related to use of functions of image forming apparatus 44.

FIG. 18 shows, in the form of a flowchart, a control structure of a program executed in an image forming system 1030 in accordance with a tenth embodiment.

DESCRIPTION OF THE PREFERRED EMBODIMENTS

Figure 1:
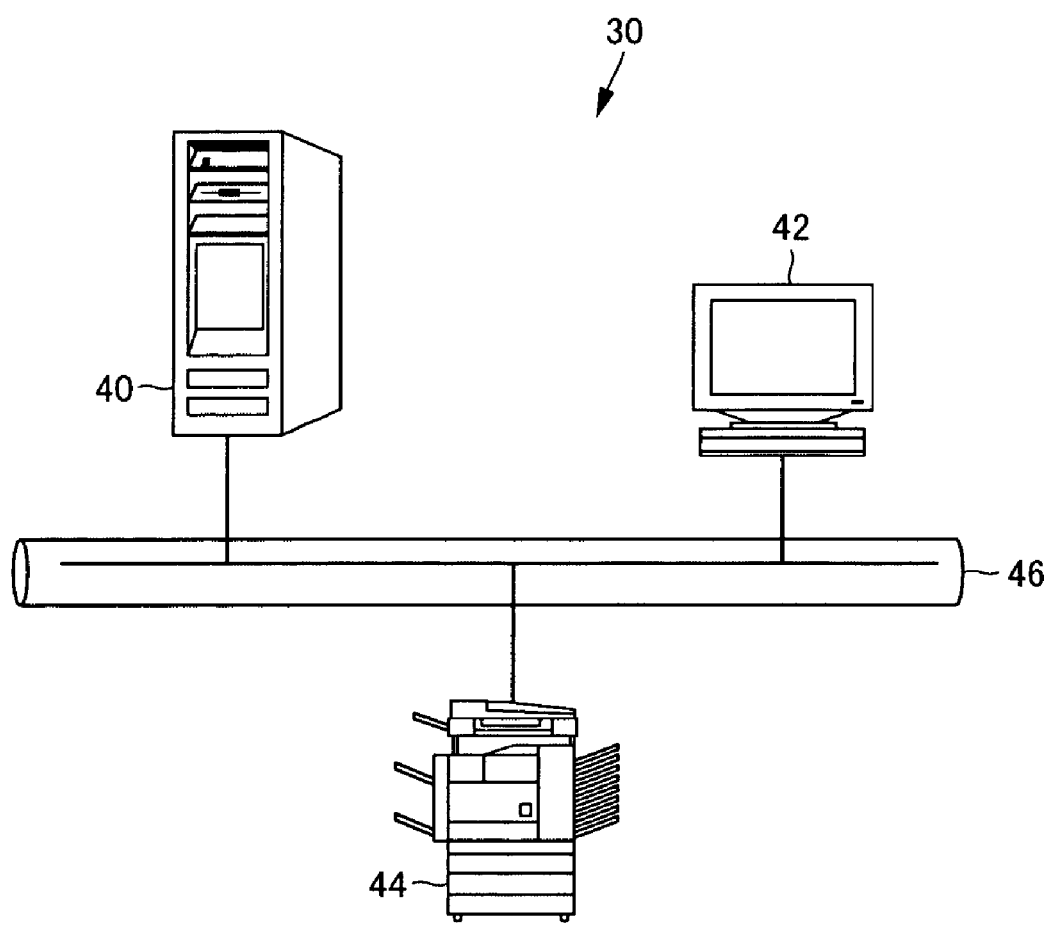
FIG. 1 shows a configuration of an image forming system 30 in accordance with a first embodiment of the present invention.

In the following description and in the drawings, the same components are denoted by the same reference characters and same names. Their functions are also the same. Therefore, detailed description thereof will not be repeated.

First Embodiment

Configuration

Referring to FIG. 1, an image forming system 30 includes an image forming apparatus 44 for performing image printing, an information processing apparatus 42 for issuing an instruction to print image data to image forming apparatus 44, a server 40 issuing a password for controlling operations of image forming apparatus 44 in response to a request from information processing apparatus 42, and a network 46 to which server 40, information processing apparatus 42 and image forming apparatus 44 are connected. Server 40, information processing apparatus 42 and image forming apparatus 44 are communicable to each other through network 46.

Figure 2:
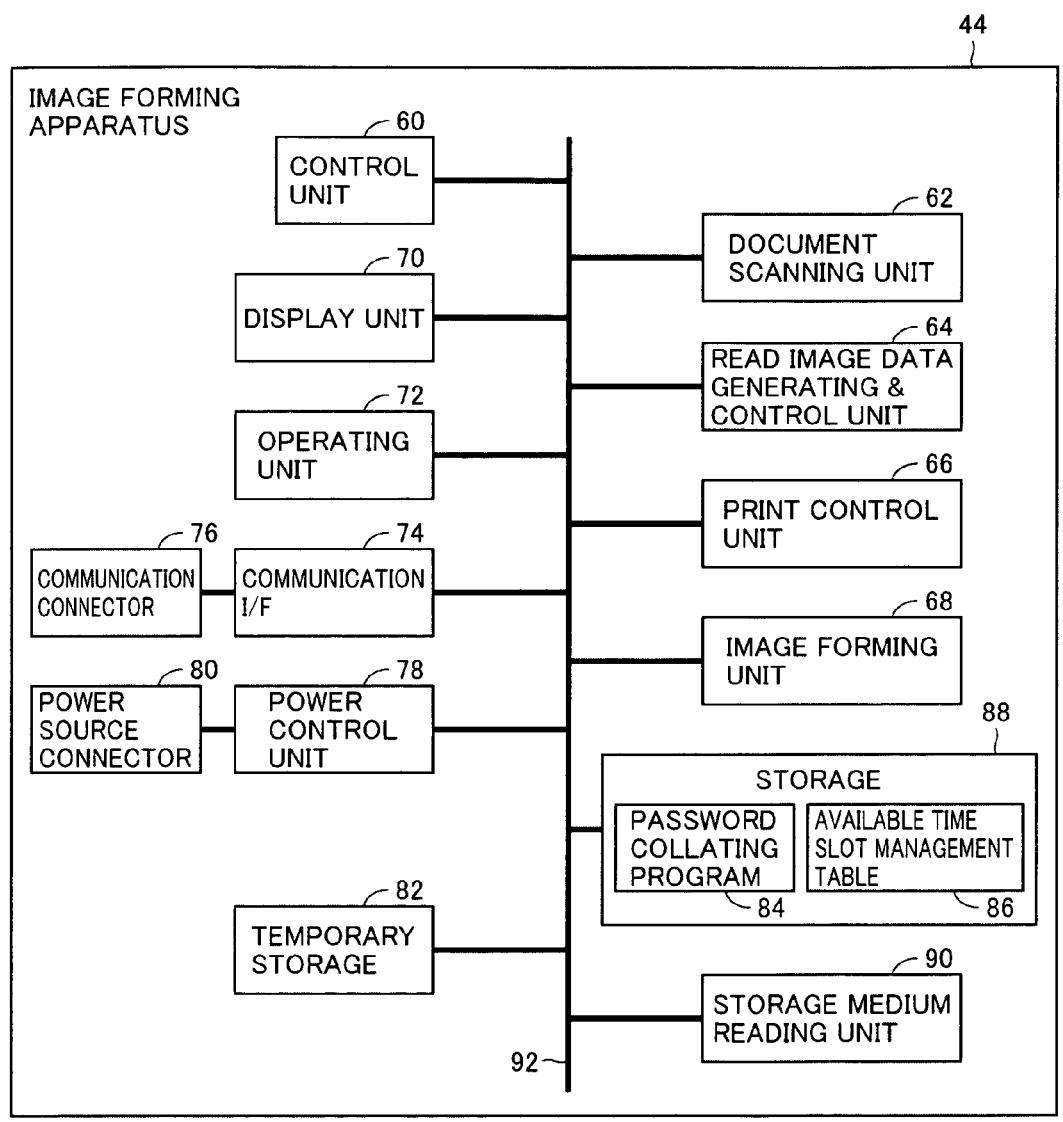
FIG. 2 is a block diagram showing an internal configuration of an image forming apparatus 44.

Referring to FIG. 2, image forming apparatus 44 includes: a control unit 60 for overall control of image forming apparatus 44; a bus 92 connected to control unit 60; a document scanning unit 62 for scanning and optically reading a document placed on a platen; a read image data generation control unit 64 for converting the optical signal read by document scanning unit 62 and thereby for generating image data; a print control unit 66 for controlling a process for printing the input image data; an image forming unit 68 for printing the image data input from print control unit 66 to a paper medium; and a display unit 70 for displaying information related to document reading and printing processes. Image forming apparatus 44 further includes: an operating unit 72 receiving an operation instruction from a user and passing it to control unit 60; a communication interface 74 for controlling communication with an external device; a communication connector 76 connected to communication interface 74; a power control unit 78 for controlling detection of power consumption, setting to standby state and power off of image forming apparatus 44; a power source connector 80 connected to power control unit 78; a temporary storage unit 82 for temporarily storing read or input image data; a storage unit 88 for storing various programs to be executed by image forming apparatus 44 and various pieces of information; and a storage medium reading unit 90 for reading information stored in an external storage medium such as an IC (Integrated Circuit) card and passing the information to control unit 60. Storage unit 88 stores a password collating program 84, and an available time slot management table 86. Document scanning unit 62, read image data generation control unit 64, print control unit 66, image forming unit 68, storage unit 88, storage medium reading unit 90, display unit 70, operating unit 72, communication interface 74, power control unit 78 and temporary storage unit 82 are connected through bus 92, and control unit 60 controls these components.

Figure 3:
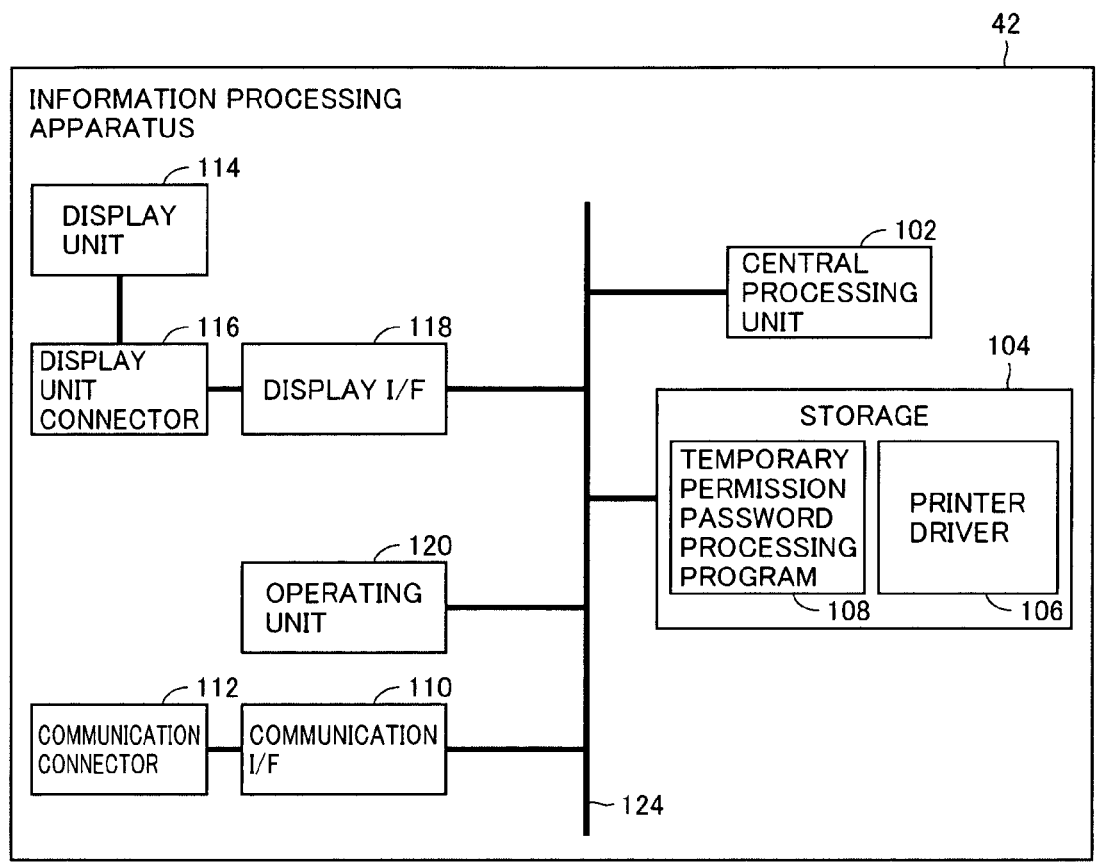
FIG. 3 is a block diagram showing an internal configuration of an information processing apparatus 42.

Referring to FIG. 3, information processing apparatus 42 includes: a storage unit 104 storing programs to be executed in information processing unit 42 and various pieces of information; a central processing unit 102 for controlling information processing apparatus 42 as a whole and realizing a desired function, by calling and executing a program stored in storage unit 104; a bus 124 connected to central processing unit 102; a display interface 118 connected to bus 124; a display unit connector 116 connected to display interface 118; a display unit 114 connected to display unit connector 116; an operating unit 120 receiving a user operation and passing it to central processing unit 102; a communication interface 110 for controlling communication with an external device; and a communication connector 112 connected to communication interface 110. Storage unit 104 stores a temporary permission password processing program 108, and a printer driver 106 for forming print image data upon receiving a print instruction from an application and transmitting the data to image forming apparatus 44. Storage unit 104, communication interface 110, display interface 118 and operating unit 120 are connected through bus 124, and central processing unit 102 controls these components.

Figure 4:
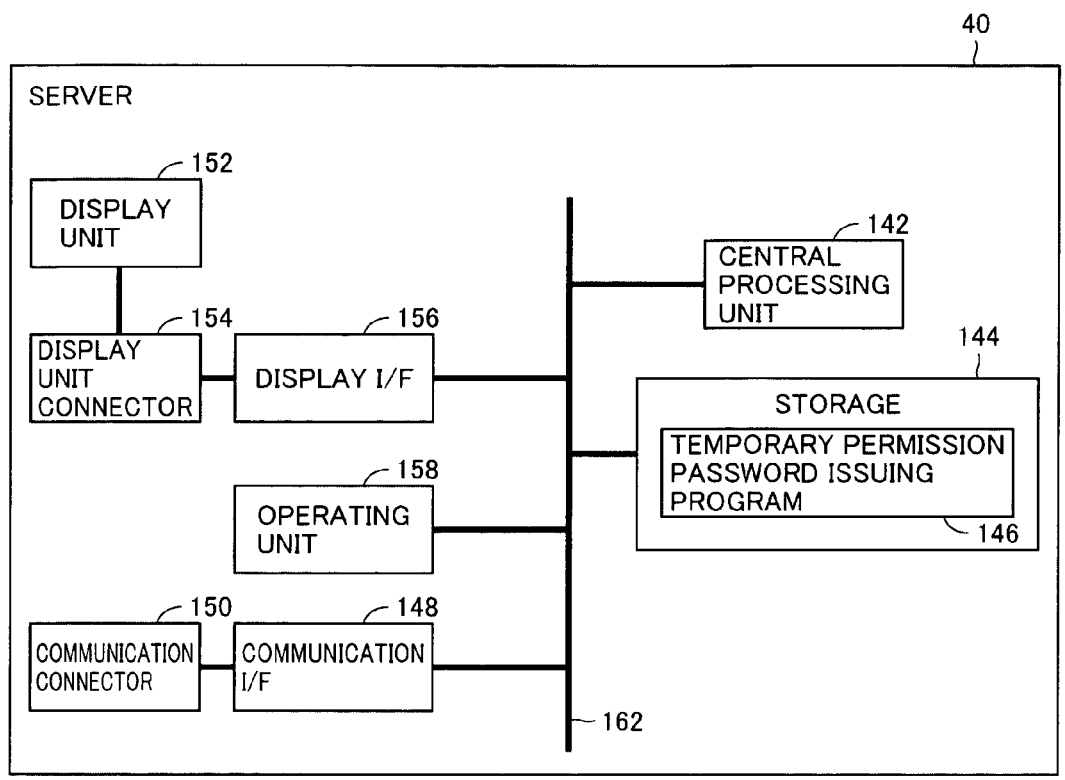
FIG. 4 is a block diagram showing an internal configuration of a server 40.

Referring to FIG. 4, server 40 includes: a storage unit 144 for storing programs to be executed in server 40 and various pieces of information; a central processing unit 142 for controlling server 40 as a whole and realizing a desired function, by calling and executing a program stored in storage unit 144; a bus 162 connected to central processing unit 142; a display interface 156 connected to bus 162; a display unit connector 154 connected to display interface 156; a display unit 152 connected to display unit connector 154; an operating unit 158 receiving a user operation and passing it to central processing unit 142; a communication interface 148 connected to bus 162; and a communication connector 150 connected to communication interface 148. Storage unit 144 stores a temporary permission password issuing program 146. Storage unit 144, communication interface 148, display interface 156 and operating unit 158 are connected through bus 162, and central processing unit 142 controls these components.

Referring to FIG. 5, whether use of image forming apparatus 44 is permitted or prohibited is set for each day of the week and each time slot. In the example of FIG. 5, setting related to use of image forming apparatus 44 is made on hour basis. It is also possible to set on minute basis. The device used for storing available time slot management table 86 may be image forming apparatus 44, information processing apparatus 42 or server 40. In the present embodiment, available time slot management table 86 is stored in image forming apparatus 44.

Figure 6:
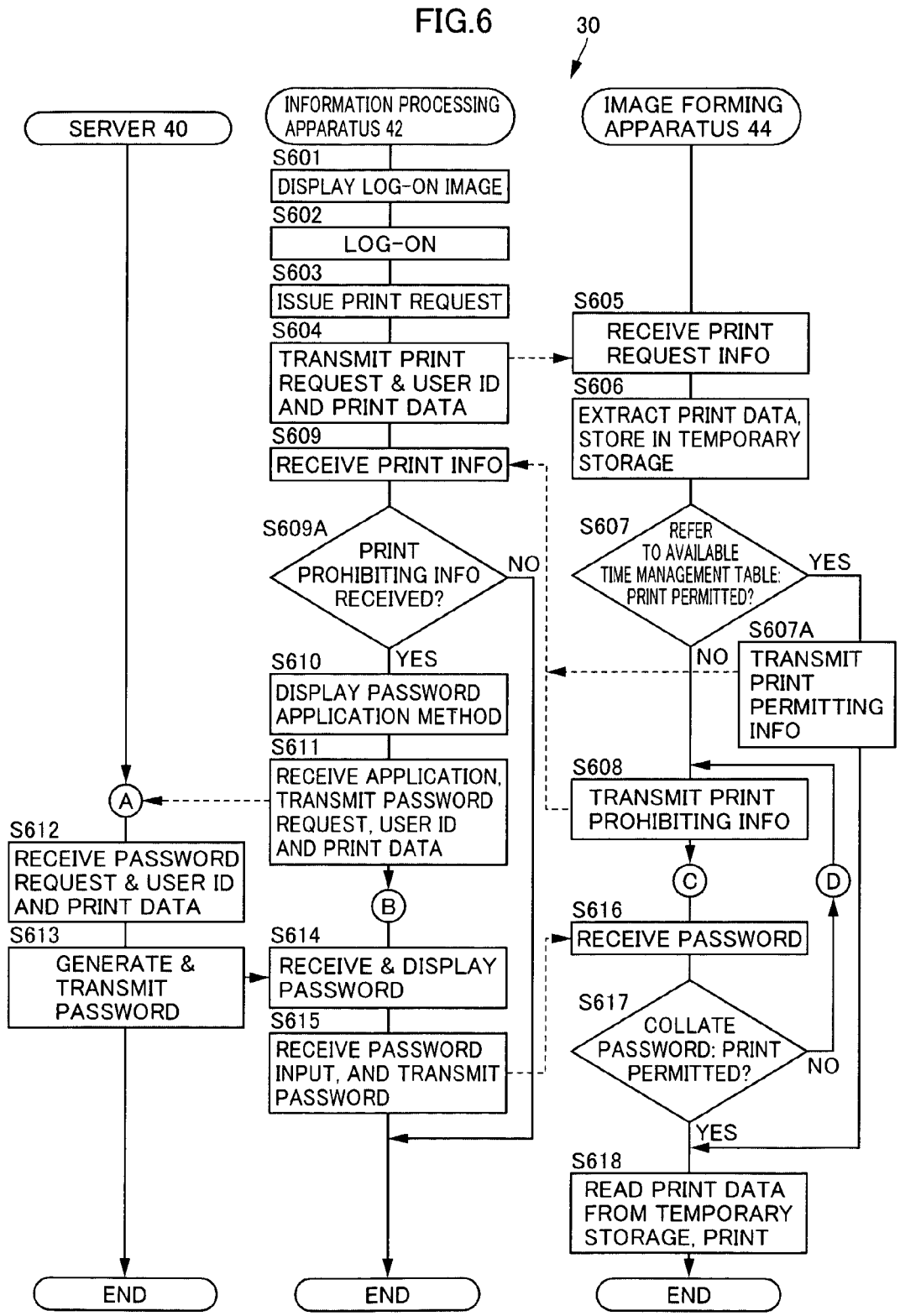
FIG. 6 shows, in the form of a flowchart, a control structure of a program executed in image forming system 30 in accordance with the first embodiment.

Referring to FIG. 6, programs executed by central processing unit 142 of server 40, central processing unit 102 of information processing unit 42 and control unit 60 of image forming apparatus 44 respectively have the following control structures.

Connectors A, B, C and D in the flowchart of FIG. 6 are provided for convenience and simplicity of description related to the configuration of the second and the other embodiments.

Referring to FIG. 6, the program executed by server 40 includes: a step (hereinafter simply denoted by "S") 612 of receiving a temporary permission password request, a user ID and print data from information processing apparatus 42; and S613, following S612, of generating the temporary permission password and transmitting it to information processing apparatus 42 as a source of password request. After execution of S613, this program ends.

The program executed by information processing apparatus 42 includes: S601 of displaying a log-on image on display unit 114; S602, following S601, of receiving a user ID input from a user and performing a log-on process; S603, following S602, of receiving a user operation of application software and issuing a print request; S604, following S603, of transmitting print request information including print data and the user ID information input at the time of log-on, using printer driver 106, to image forming apparatus 44; S609, following S604, of receiving the print information transmitted from image forming apparatus 44; S609A, following S609, of determining whether or not the received print information is print prohibiting information, and branching control flow depending on the result of determination; S610, executed if it is determined at S609A that the print prohibiting information has been received (YES), of displaying a method of applying for a temporary permission password on display unit 114; S611, following S610, of receiving a password application operation by the user through operating unit 120, and transmitting a temporary permission password request, user ID and print data to server 40; S614, following S611, of receiving the temporary permission password from server 40 and displaying it on display unit 114; and S615, following S614, of receiving a password input operation by the user and transmitting the temporary permission password to image forming apparatus 44. After execution of S615, the program ends. If it is determined at S609A that the print prohibiting information has not been received (NO), the program ends.

The program executed by image forming apparatus 44 includes: S605 of receiving print request information from information processing apparatus 42; S606, following S605, of extracting print data from the received print request information, and storing the data in temporary storage unit 82; S607, following S606, of comparing current date and time with the available time of image forming apparatus 44 to determine whether or not printing is permitted, and branching the control flow depending on the result of determination; S608, executed if it is determined at S607 that printing is not permitted (NO), of transmitting print prohibiting information to information processing apparatus 42; S616, following S608, of receiving a temporary permission password from information processing apparatus 42; S617, following S616, of collating the received temporary permission password and the result of execution of password collating program 84 to determine whether printing is to be permitted or not, and branching the control flow depending on the result of determination; and S618, executed if it is determined at S617 that printing is permitted (YES), of reading the print data that has been stored in temporary storage unit 82, and executing printing. After execution of S618, the program ends. The program further includes S607A, executed if it is determined at S607 that printing is permitted (YES), of transmitting print permitting information to information processing apparatus 42. After S607A, S618 is executed, and the program ends. If it is determined at S617 that printing is not permitted (NO), control proceeds to S608.

Figure 7:
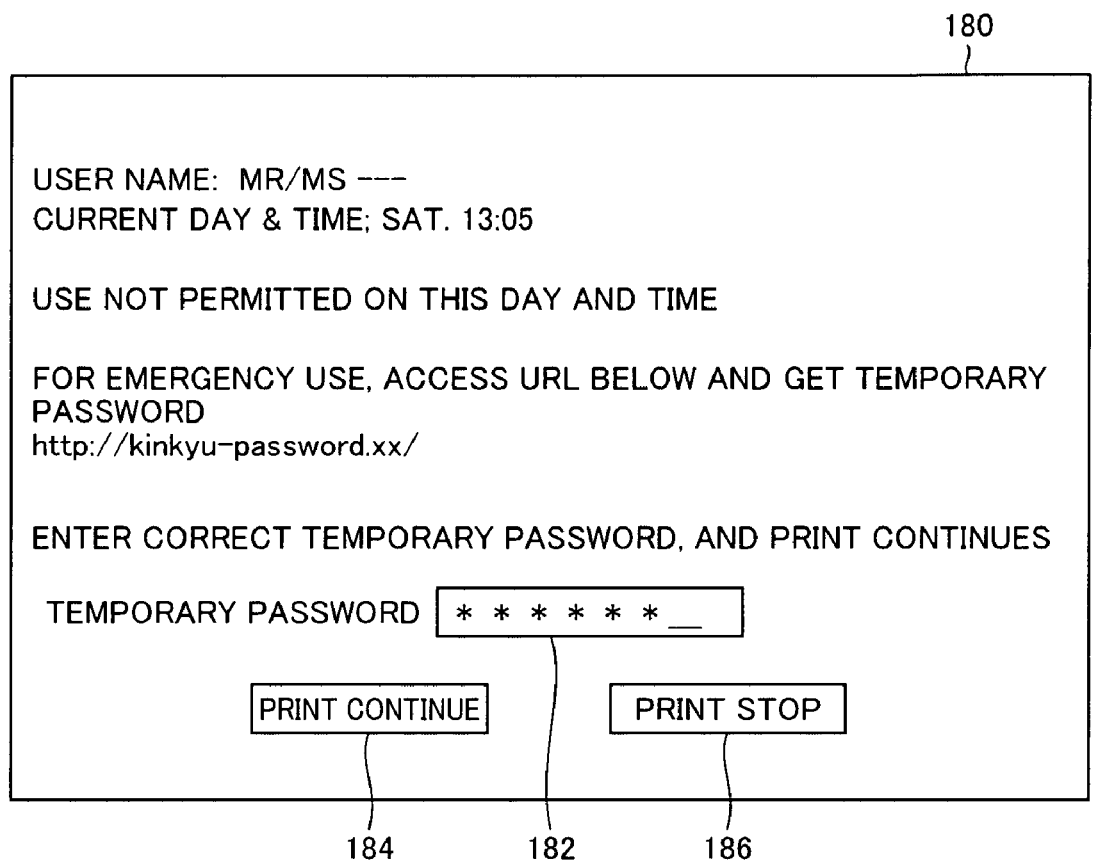
FIG. 7 is a display image 180 displayed when printing is to be done before or after print available time slot, on a display unit 114 at S610.

Referring to FIG. 7, display image 180 includes a text box 182 for receiving an input of temporary permission password, a print continue button 184, and a print stop button 186. On display image 180, when the user inputs the issued temporary permission password to text box 182 and presses print continue button 184, information processing apparatus 42 transmits the temporary permission password to image forming apparatus 44.

—Operation—

Image forming system 30 in accordance with the first embodiment operates in the following manner.

In image forming system 30, whether an operation of image forming apparatus 44 is "PERMITTED" or "PROHIBITED" is set beforehand for every day of the week and every time slot. The set information is stored in available time slot management table 86, which is stored in image forming apparatus 44.

Each user of image forming system 30 has a user ID allocated beforehand. The user ID is used for identifying each individual.

At the time of power-on of information processing apparatus 42, the user inputs his/her user ID to log-on (S601, S602). When the user operates an application and issues a print instruction from information processing apparatus 42 (S603), print request information, user ID and print data are transmitted to image forming apparatus 44 (S604). In image forming apparatus 44, the received print data is temporarily stored in temporary storage unit 82 (S605, S606). Image forming apparatus 44 refers to the date and time when the print instruction was received and available time slot management table 86, to determine whether it is in the use-permitted time slot (S607). If it is in the available time slot, print permitting information is transmitted to information processing apparatus 42 (S607A), the print data stored in temporary storage 82 is read, and printing is executed (S618). If it is not in the available time slot, print prohibiting information is transmitted to information processing apparatus 42 (S608). In information processing apparatus 42, if the print information transmitted from image forming apparatus 44 is received (S609) and the print permitting information is received (not the print prohibiting information) (NO at S609A), the program ends. If the print prohibiting information is received (YES at S609A), a display image 180 is displayed, informing the fact that it is in print-prohibited time slot and indicating a method of applying for a temporary permission password that allows temporary use of the apparatus (S610). The user makes an application in accordance with the application method, and receiving the application, information processing apparatus 42 transmits a request for issuing the temporary permission password to server 40 (S611). At the same time, it transmits the user ID and the print data. Receiving the password request, server 40 issues the temporary permission password, and transmits it to information processing apparatus 42 (S612, S613). Receiving the temporary permission password from server 40, information processing apparatus 42 displays it on display unit 114 (S614). Then, in response to a password input from the user in text box 182 on display image 180 and pressing of print continue button 184, a temporary permission password is transmitted to image forming apparatus 44 (S615). In image forming apparatus 44, whether or not the received password is correct is determined (S616, S617), and if it is correct, the print data stored in temporary storage unit 82 is read and printing is executed. If the password is not correct, printing is not executed, and information processing apparatus 42 again displays a message asking input of a password.

As described above, in the image forming system in accordance with the present embodiment, if it becomes necessary to use image forming apparatus 44 before or after available hours, it is possible to use image forming apparatus as a temporary permission password is issued. By the issuance of temporary permission password, the user can use the apparatus on his/her own before or after the available time slot, saving time and labor of asking the administrator to change setting during off-hours.

Second Embodiment

Configuration

Figure 8:
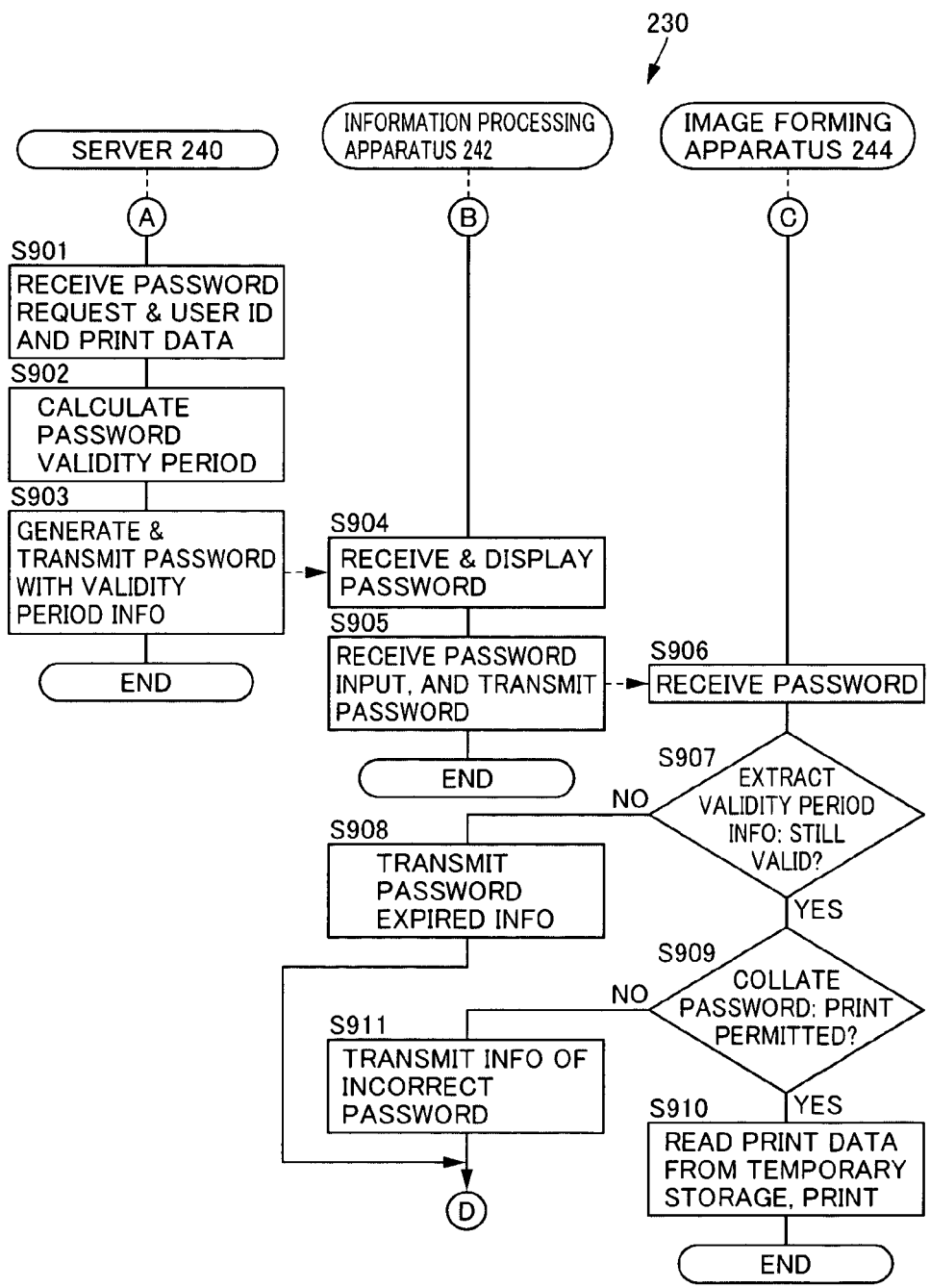
FIG. 8 shows, in the form of a flowchart, a control structure of a program executed in an image forming system 230 in accordance with a second embodiment.

Referring to FIG. 8, an image forming system 230 in accordance with the second embodiment of the present invention will be described in the following. Image forming system 230 includes a server 240, an information processing apparatus 242 and an image forming apparatus 244. The hardware configuration of these are the same as that of server 40, information processing apparatus 42 and image forming apparatus 44 of the first embodiment and, therefore, description thereof will not be repeated.

FIG. 8 represents programs executed by central processing unit 142 of server 240, central processing unit 102 of information processing apparatus 242 and controller 60 of image forming apparatus 244 in image forming system 230 in accordance with the second embodiment. In FIG. 8, the processes up to connectors A, B and C are the same as S601 to S611 of the programs executed by server 40, information processing apparatus 42 and image forming apparatus 44 of the first embodiment, respectively.

Referring to FIG. 8, the program executed by server 240 includes: S901 of receiving the temporary permission password request, user ID and print data from information processing apparatus 242; S902, following S901, of calculating a validity period (for example, three hours from issuance of a password in response to a first print request from a certain user ID) of the temporary permission password; and S903, following S902, of generating the temporary permission password including the calculated validity period information and transmitting the temporary permission password to information processing apparatus 242 as a source of password request. After execution of S903, the program ends.

The program executed by information processing apparatus 242 includes: S904, following S611 of FIG. 6, of receiving the temporary permission password from server 240 and displaying it on display unit 114; and S905, following S904, of receiving a password input operation by the user, and transmitting the temporary permission password to image forming apparatus 244. After execution of S905, the program ends.

The program executed by image forming apparatus 244 includes: S906, following S608 shown in FIG. 6, of receiving the temporary permission password from information processing apparatus 242; S907, following S906, of analyzing the received temporary permission password, extracting the validity period information, determining whether or not the temporary password is still valid, and branching control flow depending on the result of determination; and S908 executed if it is determined at S907 that the temporary permission password is no longer valid (NO), of transmitting print prohibiting information including the content "input temporary permission password already expired" to information processing apparatus 242.

The program further includes: S909, executed if it is determined at S907 that the temporary permission password is still valid (YES), of collating the temporary permission password and the result of execution of password collating program 84, to determine whether or not printing is to be permitted, and branching control flow depending on the result of determination; S911, executed if it is determined at S909 that printing is not permitted (NO), of transmitting print prohibiting information including the contents "input password incorrect" to information processing apparatus 242 as a source of print request; and S910, executed if it is determined at S909 that printing is permitted (YES), of reading the print data stored in temporary storage 82 and executing printing. After execution of S910, the program ends. After execution of S908 or S911, control proceeds to S608 of FIG. 6. It is noted that in the second embodiment, after S608 of FIG. 6, the process proceeds to S904 of FIG. 8.

—Operation—

The image forming system 230 in accordance with the second embodiment operates in the following manner.

In the image forming system 230 in accordance with the second embodiment, as in the first embodiment, whether an operation of image forming apparatus 244 is "PERMITTED" or "PROHIBITED" is set beforehand for every day of the week and every time slot. The set information is stored in available time slot management table 86, which is stored in image forming apparatus 244. Each user of image forming system 230 has a user ID allocated beforehand.

In the second embodiment, the temporary permission password issued by server 240 has a validity period and controlled such that an operation is canceled if the validity period of temporary permission password has been expired.

Up to the issuance of the request by information processing apparatus 242 for temporary permission password to server 240, the operation is the same as in the first embodiment. When the request for issuance of temporary permission password is transmitted from information processing apparatus 242, the user ID and the print data are transmitted simultaneously.

In server 240, with reference to the received user ID, the validity period (for example, three hours from issuance of a password in response to a first print request from a certain user ID) of the temporary permission password is calculated, a temporary permission password including the calculated validity period information is generated, and transmitted to information processing apparatus 242 (S902, S903).

Information processing apparatus 242 displays the temporary permission password received from server 240 (S904). Then, in response to a password input from the user in text box 182 on display image 180 and pressing of print continue button 184, a temporary permission password is transmitted to image forming apparatus 244 (S905).

In image forming apparatus 244, the validity period information is extracted from the received temporary permission password, and whether or not the password is still valid is determined (S907). If it is still valid, whether or not the temporary permission password itself is correct is determined (S909), and if it is correct, printing is executed (S910). If the validity period has been expired, information that "validity period of temporary permission password is already expired" is transmitted to information processing apparatus 242, and printing is not executed (S908). If the password is incorrect, information that "input password is incorrect" is transmitted to information processing apparatus 242, and printing is not executed. (S911).

As described above, in the image forming system in accordance with the second embodiment, the temporary permission password issued by server 240 is adapted to have a validity period and, therefore, it is possible to set time restriction on the user ID in relation to the operation of image forming apparatus 244 before or after the available hours. Since there is a restriction on the operation time, time period used for unnecessary printing can be reduced, preventing private use.

Third Embodiment

Configuration

Figure 10:
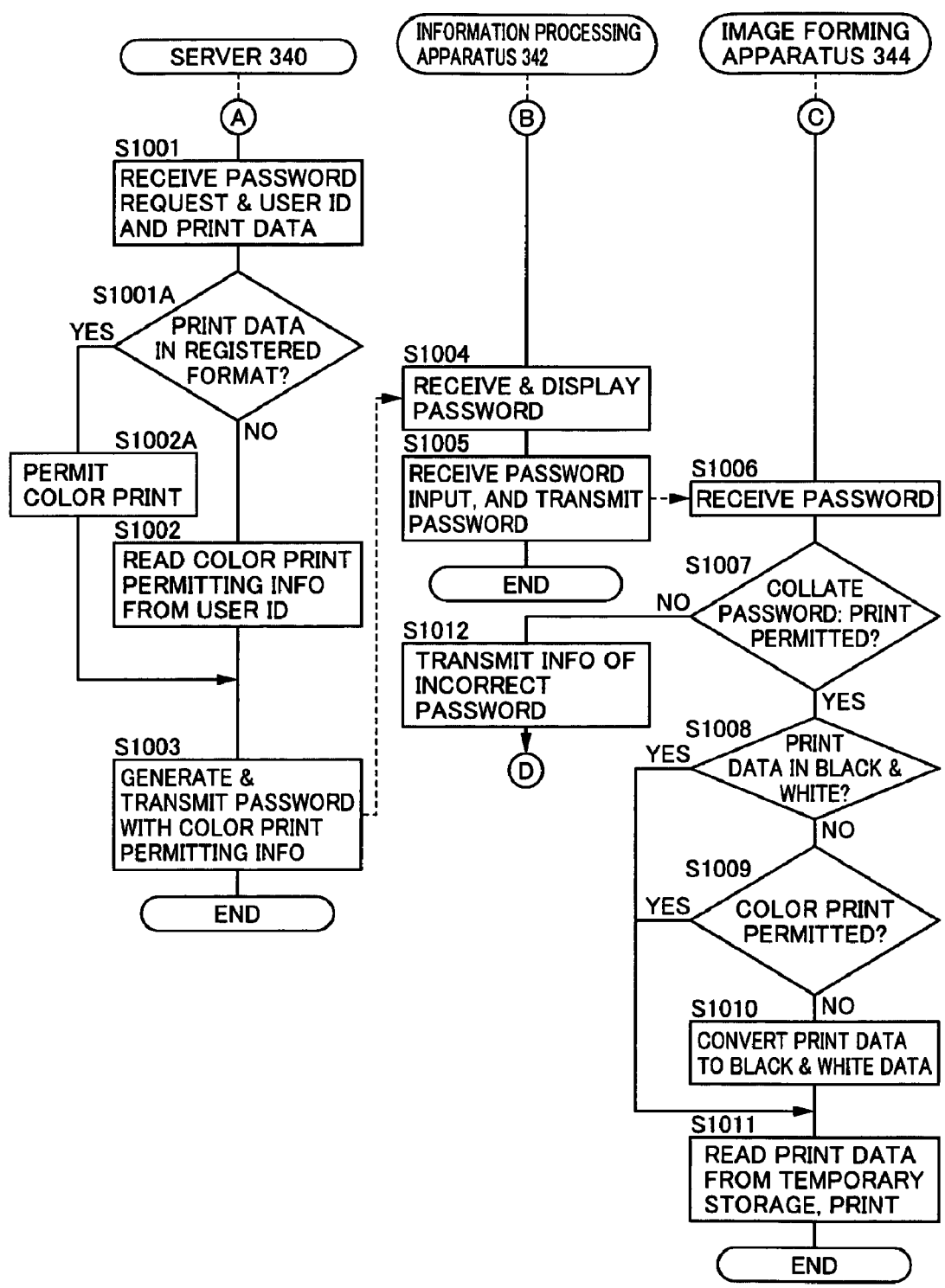
FIG. 10 shows, in the form of a flowchart, a control structure of a program executed in an image forming system 330 in accordance with a third embodiment.

Referring to FIGS. 9 and 10, an image forming system 330 in accordance with the third embodiment of the present invention will be described in the following. Image forming system 330 includes a server 340, an information processing apparatus 342 and an image forming apparatus 344. The hardware configuration of these are the same as that of server 40, information processing apparatus 42 and image forming apparatus 44 of the first embodiment and, therefore, description thereof will not be repeated.

Referring to FIG. 9, in a user-by-user function setting table 200, time slots for which setting related to use of image forming apparatus, different from that of available time slot management table 86 is made, setting as to whether or not a watermark is to be superposed on a printed image, and setting as to whether color printing is to be permitted, are stored for each user ID. In the system of the present embodiment, the setting related to watermark is not used.

In the third embodiment, in relation to color printing, whether both color and black-and-white printings are permitted or only the black-and-white printing is permitted is set beforehand for each user ID, and stored in user-by-user function setting table 200. In the present embodiment, user-by-user function setting table 200 is stored in image forming apparatus 344 and server 340.

In the third embodiment, further, print format or formats used for business operations are registered in advance in server 340.

FIG. 10 represents programs executed by central processing unit 142 of server 340, central processing unit 102 of information processing apparatus 342 and controller 60 of image forming apparatus 344 in image forming system 330 in accordance with the third embodiment. In FIG. 10, the processes up to connectors A, B and C are the same as S601 to S611 of the programs executed by server 40, information processing apparatus 42 and image forming apparatus 44 of the first embodiment, respectively. It is noted, however, that in the third embodiment, if it is determined at S607 that printing is not permitted, the user ID and the user-by-user function setting table 200 are referred to, and if there is any setting related to the use of image forming apparatus for each user ID, the operation follows the setting.

Referring to FIG. 10, the program executed by server 340 includes: S1001 of receiving a temporary permission password request, a user ID and print data from information processing apparatus 342; S1001A, following S1001, of analyzing the received print data and determining whether or not the print data is in a format registered in server 340 beforehand, and branching control flow depending on the result of determination; S1002A, executed if it is determined at S1001A that the print data is in the registered format (YES), of issuing information permitting color printing; S1002, executed if it is determined at S1001A that the print data is not in the registered format (NO), of making a reference to the user ID and user-by-user function setting table 200, and reading which of "black-and-white only" or "both color and black-and-white" is set as color print permitting information; and S1003, executed following S1002 or S1002A, of generating a temporary permission password including the color print permitting information and transmitting it to information processing apparatus 342 as the source of password request. After execution of S1003, the program ends.

The program executed by information processing apparatus 342 includes: S1004, following S611 shown in FIG. 6, of receiving the temporary permission password from server 340 and displaying it on display unit 114; and S1005, following S1004, of receiving a password input operation by the user, and transmitting the temporary permission password to image forming apparatus 344. After execution of S1005, the program ends.

The program executed by image forming apparatus 344 includes: S1006, following S608 shown in FIG. 6, of receiving the temporary permission password from information processing apparatus 342; S1007, following S1006, of collating the received temporary permission password and the result of execution of password collating program 84 to determine whether printing is to be permitted or not, and branching the control flow depending on the result of determination; S1008, executed if it is determined at S1007 that printing is permitted (YES), of determining whether or not the print data stored in temporary storage unit 82 is black-and-white data, and branching the control flow depending on the result of determination; and S1011, executed if it is determined at S1008 that the print data is black-and-white data (YES), of reading the print data stored in temporary storage unit 82 and executing printing. After execution of S1011, the program ends.

The program further includes: S1009, executed if it is determined at S1008 that the print data is not the black-and-white data (NO), of analyzing the received temporary permission password, extracting color print permitting information, and branching control flow depending on whether color printing is permitted or not; and S1010, executed if it is determined at S1009 that color printing is not permitted (NO), of converting the print data stored in temporary storage unit 82 to black-and-white data. After execution of S1010, S1011 is executed, and the program ends. If it is determined at S1009 that color printing is permitted (YES), S1011 is executed and the program ends.

The program further includes S1012, executed if it is determined at S1007 that printing is not permitted (NO), of transmitting print prohibiting information including the information that "input password is incorrect" to information processing apparatus 342 as the source of print request. After execution of S1012, control proceeds to S608 shown in FIG. 6.

—Operation—

Image forming system 330 in accordance with the third embodiment operates in the following manner.

In the image forming system 330 in accordance with the third embodiment, as in the first embodiment, whether an operation of image forming apparatus 344 is "PERMITTED" or "PROHIBITED" is set beforehand for every day of the week and every time slot. The set information is stored in available time slot management table 86, which is stored in image forming apparatus 344. Each user of image forming system 330 has a user ID allocated beforehand.

In the third embodiment, additionally, time slots in which use of image forming apparatus 344 is permitted, separate from that of available time slot management table 86, and setting as to whether color printing is to be permitted or only the black-and-white printing is permitted, are set in advance for each user ID. These pieces of setting information are stored in a table called user-by-user function setting table 200. User-by-user function setting table 200 is stored in image forming apparatus 344 and server 340.

In the third embodiment, further, print format or formats used for business operations are registered in advance in server 340.

Image forming system 330 in accordance with the third embodiment operates in the similar manner as in the first embodiment up to the issuance of the request by information processing apparatus 342 for temporary permission password to server 340. If it is determined at S607 that printing is not permitted, however, image forming apparatus 344 refers to the user ID and the user-by-user function setting table 200, and if there is any setting related to the use of image forming apparatus for each user ID, the operation follows the setting. This is different from the first embodiment. When information processing apparatus 342 transmits the request for issuance of temporary permission password to server 340, it together transmits the user ID and the print data.

In server 340, the received print data is analyzed, and whether or not the print data matches a format registered in advance is determined (S1001A). If the print data matches the format registered in advance, server 340 permits color printing (S1002A), generates a temporary permission password including the color print permitting information and transmits it to information processing apparatus 342 (S1003). If the print data does not match the format registered in advance, server 340 compares the received user ID and the user-by-user function setting table 200, reads the color print permitting information set for the user ID (S1002), generates a temporary permission password including the read color print permitting information, and transmits it to information processing apparatus 342.

Information processing apparatus 342 displays the temporary permission password received from server 340 (S1004). Then, in response to a password input from the user in text box 182 on display image 180 and pressing of print continue button 184, a temporary permission password is transmitted to image forming apparatus 344 (S1005).

In image forming apparatus 344, whether or not the received temporary permission password is correct is determined (S1007). If the password is correct, whether the print data stored in temporary storage unit 82 is black-and-white data or color data is determined (S1008). If it is black-and-white data (YES at S1008), the print data is read from temporary storage unit 82 and printing is executed (S1011). If the print data is color data (NO at S1008), the color print permitting information included in the temporary permission password is referred to, and whether or not color printing is permitted is determined (S1009). If color printing is permitted, the print data is read from temporary storage unit 82 and printing is executed. If only the black-and-white printing is permitted, the print data stored in temporary storage unit 82 is converted to black-and-white data (S1010), the print data is read from temporary storage unit 82 and black-and-white printing is executed.

As described above, in the image forming system in accordance with the third embodiment, the print format used for business operations is registered beforehand in server 340, and whether or not the print data is in accordance with the registered format is determined. If the print data is in accordance with the registered format, color printing of the print data is permitted. If it is not in accordance with the registered format, color printing is restricted in accordance with the setting of permitting color printing or black-and-white only, set for each user ID.

In this manner, when data not in accordance with the format is to be printed, color printing during off-hours is restricted in advance based on the user ID. Therefore, unnecessary color printing by an unauthorized person can be prevented. Since unnecessary color printing is prevented, printing cost can be reduced.

As to the method of determining whether only the black-and-white printing is permitted or both color and black-and-white printing are permitted, in addition to forming user-by-user function setting table 200 and setting the color print permitting information for each user ID beforehand, a method may be possible in which only the user IDs for which color printing is permitted are registered in a separate management table in advance, and determination is made by checking whether the received user ID is included in the management table.

In the example shown in FIG. 9, the available time slot, whether or not watermark is to be superposed and whether or not color printing is permitted are all set for each user ID. It is possible, however, to set only one of these. As to the setting of available time slot, though it is made on hour basis, it is also possible to set on minute basis. Further, any of image forming apparatus 344, information processing apparatus 342 and server 340 may be used as the device for storing user-by-user function setting table 200.

Fourth Embodiment

Configuration

Figure 11:
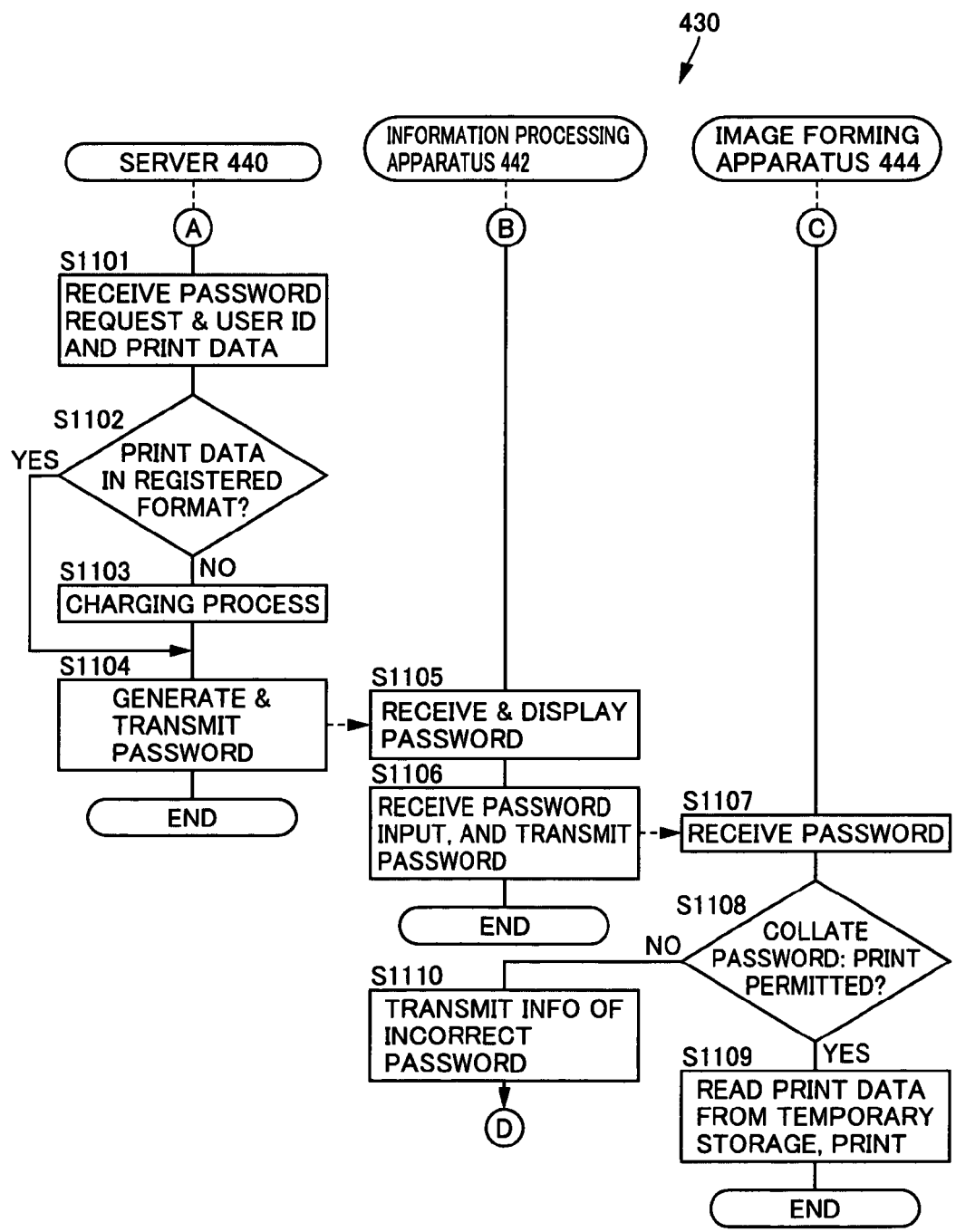
FIG. 11 shows, in the form of a flowchart, a control structure of a program executed in an image forming system 430 in accordance with a fourth embodiment.

Referring to FIG. 11, an image forming system 430 in accordance with the fourth embodiment of the present invention will be described in the following. Image forming system 430 includes a server 440, an information processing apparatus 442 and an image forming apparatus 444. The hardware configuration of these are the same as that of server 40, information processing apparatus 42 and image forming apparatus 44 of the first embodiment and, therefore, description thereof will not be repeated.

In the fourth embodiment, a print format or formats used for business operations are registered in advance in server 440.

FIG. 11 represents programs executed by central processing unit 142 of server 440, central processing unit 102 of information processing apparatus 442 and controller 60 of image forming apparatus 444 in image forming system 430 in accordance with the fourth embodiment. In FIG. 11, the processes up to connectors A, B and C are the same as S601 to S611 of the programs executed in the flow shown in FIG. 6.

Referring to FIG. 11, the program executed by server 440 includes: S1101 of receiving a temporary permission password request, a user ID and print data from information processing apparatus 442; S1102, following S1101, of analyzing the received print data and determining whether or not the print data is in a format registered in server 440 beforehand, and branching control flow depending on the result of determination; S1103, executed if it is determined at S1102 that the print data is not in accordance with the format registered in advance (NO), of charging a fee in accordance with print data information (number of printing, and type of printing, that is, black-and-white or color), to the received user ID; and S1104, following S1103, of generating a temporary permission password and transmitting it to information processing apparatus 442 as the source of password request. If it is determined at S1102 that the print data is in accordance with the format registered in advance (YES), control proceeds to S1104. After execution of S1104, the program ends.

The program executed by information processing apparatus 442 includes: S1105, following S611 shown in FIG. 6, of receiving the temporary permission password from server 440 and displaying it on display unit 114; and S1106, following S1105, of receiving a password input operation by the user and transmitting the temporary permission password to image forming apparatus 444. After execution of S1106, the program ends.

The program executed by image forming apparatus 444 includes: S1107, following S608 shown in FIG. 6, of receiving the temporary permission password from information processing apparatus 442; S1108, following S1107, of collating the received temporary permission password and the result of execution of password collating program 84, determining whether printing is to be permitted or not, and branching control flow depending on the result of determination; and S1109, executed if it is determined at S1108 that printing is permitted (YES), of reading the print data stored in temporary storage unit 82 and executing printing. After execution of S1109, the program ends.

The program further includes S1110, executed if it is determined at S1108 that printing is not permitted (NO), of transmitting print prohibiting information including the information that "input password is incorrect" to information processing apparatus 442 as the source of print request. After execution of S1110, control proceeds to S608 shown in FIG. 6.

—Operation—

Image forming system 430 in accordance with the fourth embodiment operates in the following manner.

In the image forming system 430 in accordance with the fourth embodiment, as in the first embodiment, whether an operation of image forming apparatus 444 is "PERMITTED" or "PROHIBITED" is set beforehand for every day of the week and every time slot. The set information is stored in available time slot management table 86, which is stored in image forming apparatus 444. Each user of image forming system 430 has a user ID allocated beforehand.

In the fourth embodiment, further, print format or formats used for business operations are registered in advance in server 440.

In the fourth embodiment, further, print format or formats used for business operations are registered in advance in server 440, the print data received from information processing apparatus 442 is analyzed by server 440, and if the data matches any registered format, a temporary permission password is issued directly. If the print data is not registered, a process for charging, to the user ID, a fee in accordance with the print data information is performed, and thereafter, an operation is done to issue the temporary permission password.

Image forming system 430 in accordance with the fourth embodiment operates in the similar manner as in the first embodiment up to the issuance of the request by information processing apparatus 442 for temporary permission password to server 440. When information processing apparatus 442 transmits the request for issuance of temporary permission password to server 440, it simultaneously transmits the user ID and the print data.

In server 440, the received print data is analyzed, and whether or not the print data matches a format registered in advance is determined (S1102). If the print data matches the format registered in advance, server 440 issues the temporary permission password and transmits it to information processing apparatus 442 (S1104). If it does not match, a charging process in accordance with the print data information (number of printing and type of printing, that is, black-and-white or color) is performed on the user ID (S1103), and thereafter, the temporary permission password is issued and transmitted to information processing apparatus 442.

Information processing apparatus 442 displays the temporary permission password received from server 440 (S1105). Then, in response to a password input from the user in text box 182 on display image 180 and pressing of print continue button 184, information processing apparatus 442 transmits a temporary permission password to image forming apparatus 444 (S1106).

In image forming apparatus 444, whether or not the temporary permission password received from information processing apparatus 442 is correct is determined (S1108). If the temporary permission password is correct, the print data stored in temporary storage unit 82 is read and printing is executed (S1109). If the temporary permission password is incorrect, information that "input password is incorrect" is transmitted to information processing apparatus 442, and printing is not executed (S1110).

As described above, in the image forming system in accordance with the fourth embodiment, print format or formats used for business operations are registered in advance in server 440, and whether the transmitted print data is in accordance with any of the registered format is determined. If the print data is other than the registered formats, a charging process is performed for the user ID, and therefore, the user can print for a fee. Private use can be deterred, because one must pay to print a document in a non-registered format. Further, since the charging process is done using the user ID identifying the user, it is possible to charge the user for the printing fee. Thus, cost increase resulting from private use by unknown user can be prevented.

Fifth Embodiment

Configuration

Figure 12:
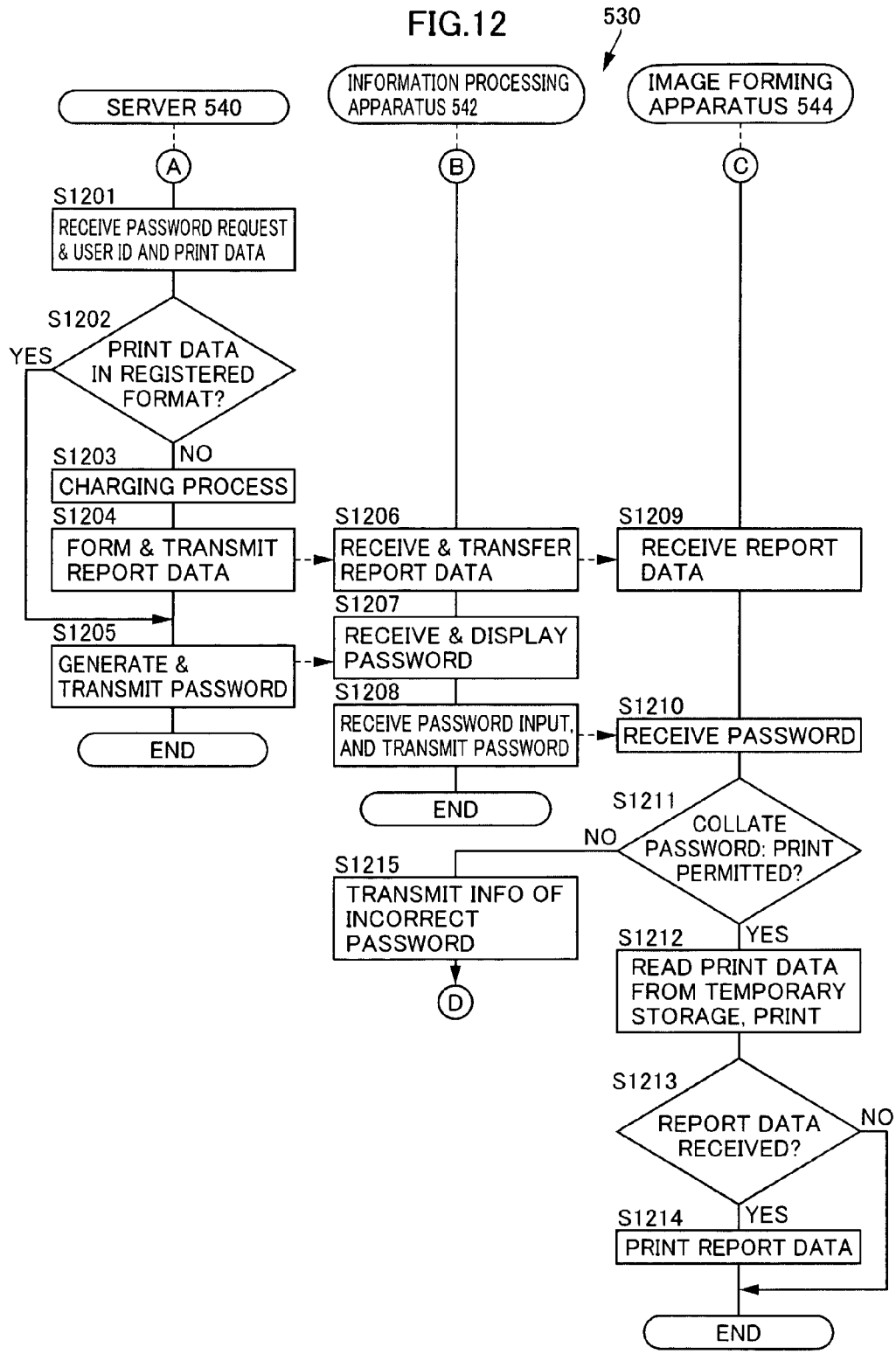
FIG. 12 shows, in the form of a flowchart, a control structure of a program executed in an image forming system 530 in accordance with a fifth embodiment.

Referring to FIG. 12, an image forming system 530 in accordance with the fifth embodiment of the present invention will be described in the following. Image forming system 530 includes a server 540, an information processing apparatus 542 and an image forming apparatus 544. The hardware configuration of these are the same as that of server 40, information processing apparatus 42 and image forming apparatus 44 of the first embodiment and, therefore, description thereof will not be repeated.

In the fifth embodiment, a print format or formats used for business operations are registered in advance in server 540.

FIG. 12 represents programs executed by central processing unit 142 of server 540, central processing unit 102 of information processing apparatus 542 and controller 60 of image forming apparatus 544 in image forming system 530 in accordance with the fifth embodiment. In FIG. 12, the processes up to connectors A, B and C are the same as S601 to S611 of the programs executed in the flow shown in FIG. 6.

Referring to FIG. 12, the program executed by server 540 includes: S1201 of receiving a temporary permission password request, a user ID and print data from information processing apparatus 542; S1202, following S1201, of analyzing the received print data and determining whether or not the print data is in a format registered in server 540 beforehand, and branching control flow depending on the result of determination; and S1205, executed if it is determined at S1202 that the print data is in the format registered in advance (YES), of generating the temporary permission password and transmitting it to information processing apparatus 542 as the source of password request.

The program further includes: S1203, executed if it is determined at S1202 that the print data is not in the format registered in advance (NO), of performing the charging process in accordance with the print data information (number of printing, and type of printing, that is, black-and-white or color), on the received user ID; and S1204, following S1203, of forming a print report data and transmitting it to information processing apparatus 542. After execution of S1204, S1205 is executed. After execution of S1205, the program ends.

The print report formed at S1204 includes information related to the number of printing, type of printing, that is, black-and-white or color, printed file name, date and time of printing and, in addition, thumbnail display of each printed page and the charged fee.

The program executed by information processing apparatus 542 includes: S1206, following S611 shown in FIG. 6, of receiving the print report data from server 540 and transferring it to image forming apparatus 544; S1207, following S1206, of receiving the temporary permission password from server 540, and displaying it on display unit 114; and S1208, following S1207, of receiving a password input operation from the user and transmitting the temporary permission password to image forming apparatus 544. After the end of S1208, the program ends.

The program executed by image forming apparatus 544 includes: S1209, following S608 shown in FIG. 6, of receiving the print report data from information processing apparatus 542; S1210, following S1209, of receiving the temporary permission password from information processing apparatus 542; S1211, following S1210, of collating the received temporary permission password and the result of execution of password collating program 84, determining whether printing is to be permitted or not, and branching control flow depending on the result of determination; and S1212, executed if it is determined at S1211 that printing is permitted (YES), of reading the print data stored in temporary storage unit 82 and executing printing.

The program further includes: S1213, following S1212, of determining whether the print report data has been received from information processing apparatus 542, and branching control flow depending on the result of determination; and S1214, executed if it is determined at S1213 that the print report data has been received (YES), of printing the print report data. After execution of S1214, the program ends. If it is determined at S1213 that the print report is not received (NO), the program ends. The program further includes S1215, executed if it is determined at S1211 that printing is not permitted (NO), of transmitting print prohibiting information including the information that "input password is incorrect" to information processing apparatus 542 as the source of print request. After execution of S1215, control proceeds to S608 shown in FIG. 6.

—Operation—

Image forming system 530 in accordance with the fifth embodiment operates in the following manner.

In the image forming system 530 in accordance with the fifth embodiment, as in the first embodiment, whether an operation of image forming apparatus 544 is "PERMITTED"

or "PROHIBITED" is set beforehand for every day of the week and every time slot. The set information is stored in available time slot management table 86, which is stored in image forming apparatus 544. Each user of image forming system 530 has a user ID allocated beforehand.

In the fifth embodiment, as in the fourth embodiment, print format or formats used for business operations are registered in advance in server 540. Server 540 analyzes the print data received from information processing apparatus 542, and if the data matches any registered format, a temporary permission password is issued directly. If the print data is of a not-registered format, a process for charging to the user ID is performed. After the charging process, server 540 forms the print report data including the print data information and the thumbnail display of each printed page.

Image forming system 530 in accordance with the fifth embodiment operates in the similar manner as in the first embodiment up to the issuance of the request by information processing apparatus 542 for temporary permission password to server 540. When information processing apparatus 542 transmits the request for issuance of temporary permission password, it transmits the user ID and the print data.

In server 540, the received print data is analyzed, and whether or not the print data matches a format registered in advance is determined (S1202). If the print data matches the registered format, the temporary permission password is issued and transmitted to information processing apparatus 542 (S1205). If it does not match, a charging process in accordance with the print data information (number of printing and type of printing, that is, black-and-white or color) is performed on the user ID (S1203). After the charging process, the print report data is formed and transmitted to information processing apparatus 542 (S1204). The formed print report includes information related to the number of printing, type of printing, that is, black-and-white or color, printed file name, date and time of printing and, in addition, thumbnail display of each printed page and the charged fee. After transmission of the print report data, server 540 issues the temporary permission password and transmits it to information processing apparatus 542.

If the print report data is received from server 540, information processing apparatus 542 directly transmits it to image forming apparatus 544 (S1206). If the temporary permission password is received from server 540, information processing apparatus 542 displays the temporary permission password (S1207). In response to a password input by the user to text box 182 of display image 180 and pressing of print continue button 184, information processing apparatus 542 transmits the temporary permission password to image forming apparatus 544 (S1208).

Image forming apparatus 544 receives the print report data from information processing apparatus 542 (S1209). In image forming apparatus 544, whether or not the temporary permission password received from information processing apparatus 542 is correct is determined (S1211). If the temporary permission password is correct, the print data stored in temporary storage unit 82 is read and printing is executed (S1212). If the temporary permission password is incorrect, image forming apparatus 544 transmits information that "input password is incorrect" to information processing apparatus 542, and printing is not executed (S1215). Further, after print execution, image forming apparatus 544 determines whether or not the print report data is received from information processing apparatus 542 (S1213), and if the print report data has been received, prints the print report data (S1214).

As described above, in the image forming system in accordance with the fifth embodiment, print format or formats used for business operations are registered in advance in server 540, and whether the transmitted print data is in accordance with any of the registered format is determined. If the print data is other than the registered formats, a charging process is performed for the user ID, and therefore, the user can print for a fee. If printing is done for a fee, image forming apparatus 544 prints the print report. The print report includes thumbnail display of each printed page in addition to the charge information and, therefore, it can be used as evidence to ask for a correction of charging, if document of unregistered format is printed in relation to business operations. Since the print report is formed, it becomes possible to distinguish business use from private use, and to prevent unnecessary charging to the user for normal business operations.

Sixth Embodiment

Configuration

Figure 13:
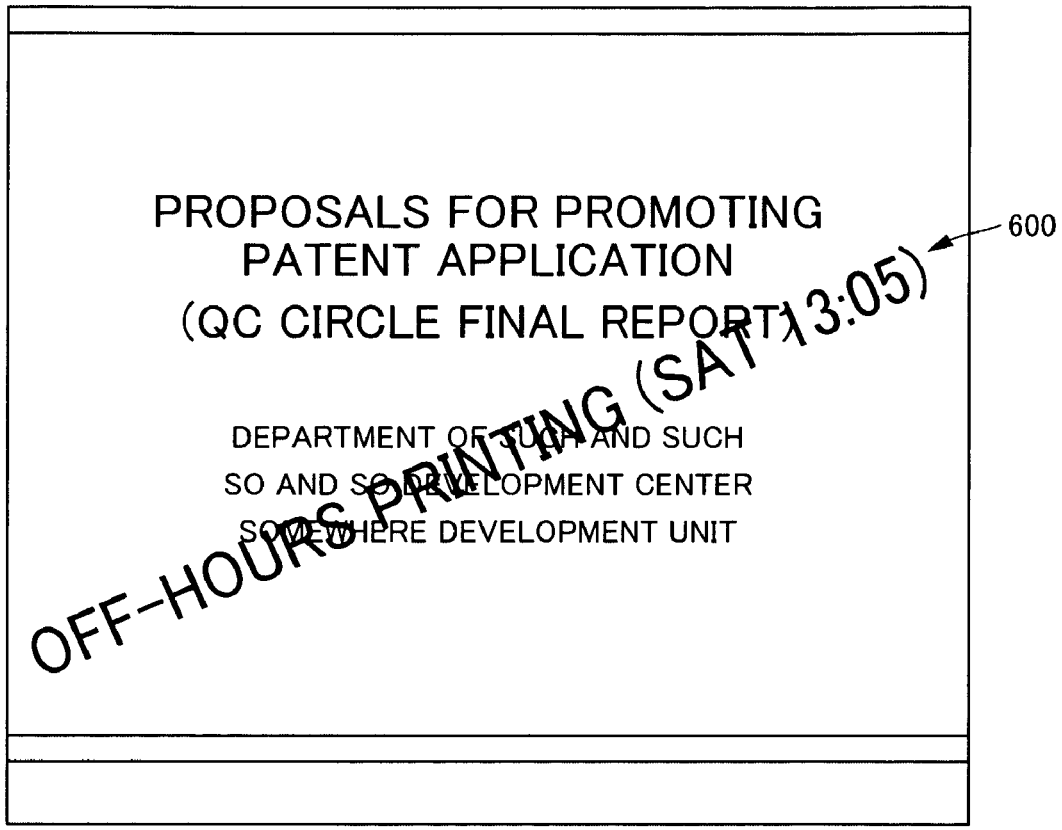
FIG. 13 shows an exemplary printing result when a watermark is superposed at S1307.
Figure 14:
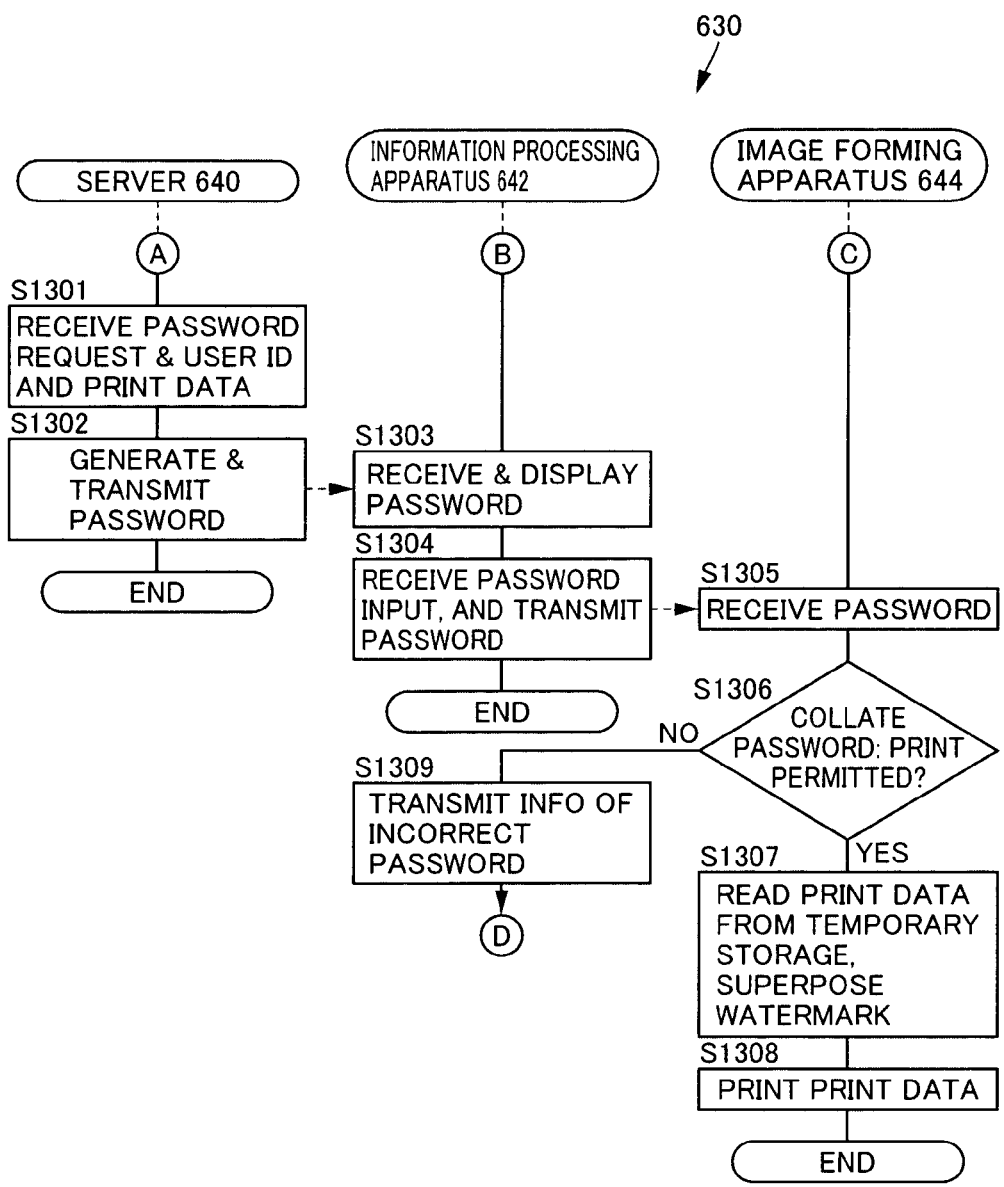
FIG. 14 shows, in the form of a flowchart, a control structure of a program executed in an image forming system 630 in accordance with a sixth embodiment.

Referring to FIGS. 13 and 14, an image forming system 630 in accordance with the sixth embodiment of the present invention will be described in the following. Image forming system 630 includes a server 640, an information processing apparatus 642 and an image forming apparatus 644. The hardware configuration of these are the same as that of server 40, information processing apparatus 42 and image forming apparatus 44 of the first embodiment and, therefore, description thereof will not be repeated. In the present embodiment, when printing is done during off-hours, a watermark is superposed on the printed document.

Referring to FIG. 13, a character sequence 600 that reads "OFF-HOURS PRINTING (SAT. 13:15)" is an example of the watermark. Character sequence 600 is to simply indicate that the printing is done during off-hours and, by way of example, the time of printing is set at the portions of day of the week and time. In the sixth embodiment, the watermark to be superposed on the print data is registered in advance in image forming apparatus 644.

FIG. 14 represents programs executed by central processing unit 142 of server 640, central processing unit 102 of information processing apparatus 642 and controller 60 of image forming apparatus 644 in image forming system 630 in accordance with the sixth embodiment. In FIG. 14, the processes up to connectors A, B and C are the same as S601 to S611 of the programs executed in the flow shown in FIG. 6.

Referring to FIG. 14, the program executed by server 640 includes: S1301 of receiving a temporary permission password request, a user ID and print data from information processing apparatus 642; and S1302, following S1301, of generating the temporary permission password and transmitting it to information processing apparatus 642 as the source of password request. After the end of S1302, the program ends.

The program executed by information processing apparatus 642 includes: S1303, following S611 shown in FIG. 6, of receiving the temporary permission password from server 640, and displaying it on display unit 114; and S1304, following S1303, of receiving a password input operation from the user and transmitting the temporary permission password to image forming apparatus 644. After the end of S1304, the program ends.

The program executed by image forming apparatus 644 includes: S1305, following S608 shown in FIG. 6, of receiving the temporary permission password from information processing apparatus 642; S1306, following S1305, of collating the received temporary permission password and the result of execution of password collating program 84, determining whether printing is to be permitted or not, and branching control flow depending on the result of determination; S1307, executed if it is determined at S1306 that printing is permitted (YES), of reading the print data stored in temporary storage unit 82 and superposing the watermark registered in advance on the print data; and S1308, following S1307, of printing the print data. After execution of S1308, the program ends.

The program further includes S1309, executed if it is determined at S1306 that printing is not permitted (NO), of transmitting print prohibiting information including the information that "input password is incorrect" to information processing apparatus 642 as the source of print request. After execution of S1309, control proceeds to S608 shown in FIG. 6.

—Operation—

Image forming system 630 in accordance with the sixth embodiment operates in the following manner.

In the image forming system 630 in accordance with the sixth embodiment, as in the first embodiment, whether an operation of image forming apparatus 644 is "PERMITTED" or "PROHIBITED" is set beforehand for every day of the week and every time slot. The set information is stored in available time slot management table 86, which is stored in image forming apparatus 644. Each user of image forming system 630 has a user ID allocated beforehand.

In the sixth embodiment, the watermark to be superposed on the print data is registered in advance in image forming apparatus 644.

Image forming system 630 in accordance with the sixth embodiment operates in the similar manner as in the first embodiment up to the issuance of the request by information processing apparatus 642 for temporary permission password to server 640. When information processing apparatus 642 transmits the request for issuance of temporary permission password, it simultaneously transmits the user ID and the print data.

Receiving a request for issuing the temporary permission password from information processing apparatus 642, server 640 generates the temporary permission password, and transmits it to information processing apparatus 642 (S1301, S1302).

Information processing apparatus 642 displays the temporary permission password received from server 640 (S1303). Then, in response to a password input from the user in text box 182 on display image 180 and pressing of print continue button 184, the temporary permission password is transmitted to image forming apparatus 644 (S1304).

Image forming apparatus 644 determines whether or not the temporary permission password received from information processing apparatus 642 is correct (S1306). If the temporary permission password is determined to be correct, the print data stored in temporary storage unit 82 is read and the watermark registered in advance is superposed on the print data (S1307). After superposing the watermark, the print data is printed (S1308). If the temporary permission password is determined to be incorrect, information that "input password is incorrect" is transmitted to information processing apparatus 642, and printing is not executed (S1309).

As described above, in the image forming system in accordance with the sixth embodiment, if printing is done before or after the print available hours, a watermark as an indication is superposed on the print data itself. Therefore, the print can be distinguished from one printed in available hours. As the visible information is added on the print data, the print result becomes less easily viewable and, therefore, abusive printing can be prevented.

Seventh Embodiment

Configuration

Figure 15:
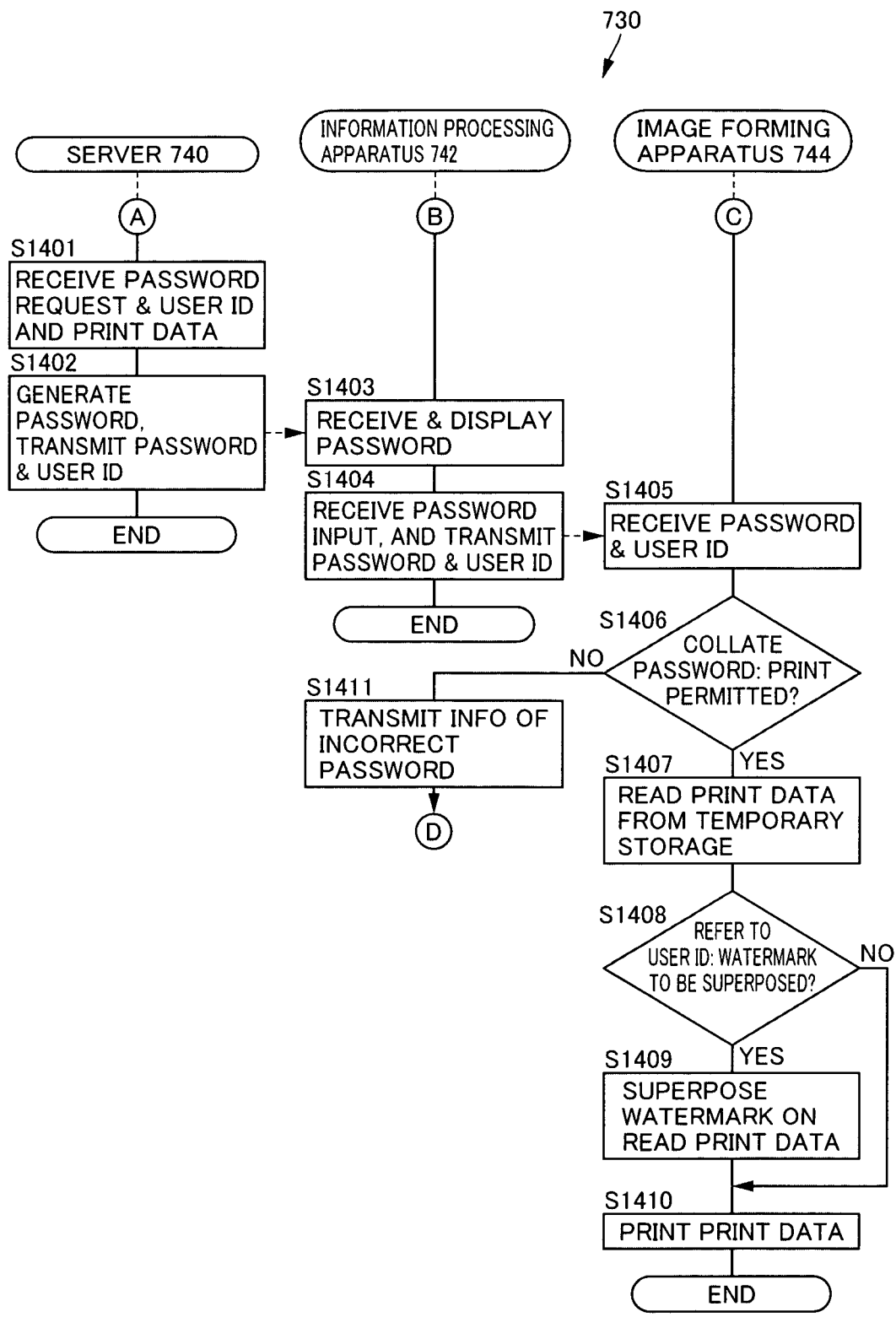
FIG. 15 shows, in the form of a flowchart, a control structure of a program executed in an image forming system 730 in accordance with a seventh embodiment.

Referring to FIG. 15, an image forming system 730 in accordance with the seventh embodiment of the present invention will be described in the following. Image forming system 730 includes a server 740, an information processing apparatus 742 and an image forming apparatus 744. The hardware configuration of these are the same as that of server 40, information processing apparatus 42 and image forming apparatus 44 of the first embodiment and, therefore, description thereof will not be repeated.

In the seventh embodiment, the watermark to be superposed on the print data is registered in advance in image forming apparatus 744. Further, for each user ID, whether or not the watermark is to be superposed on the print data is set and registered in user-by-user function setting table 200, and stored in advance in image forming apparatus 744. In the present embodiment, the setting related to color printing in user-by-user function setting table 200 is not used.

FIG. 15 represents programs executed by central processing unit 142 of server 740, central processing unit 102 of information processing apparatus 742 and controller 60 of image forming apparatus 744 in image forming system 730 in accordance with the seventh embodiment. In FIG. 15, the processes up to connectors A, B and C are the same as S601 to S611 of the programs executed by server 40, information processing apparatus 42 and image forming apparatus 44 of the first embodiment, respectively. It is noted, however, that in the seventh embodiment, if it is determined at S607 that printing is not permitted, the user ID and the user-by-user function setting table 200 are referred to, and if there is any setting related to the use of image forming apparatus for each user ID, the operation follows the setting.

Referring to FIG. 15, the program executed by server 740 includes: S1401 of receiving a temporary permission password request, a user ID and print data from information processing apparatus 742; and S1402 following S1401, of generating the temporary permission password and transmitting it to information processing apparatus 742 as the source of password request. After execution of S1402, the program ends.

The program executed by information processing apparatus 742 includes: S1403, following S611 shown in FIG. 6, of receiving the temporary permission password from server 740, and displaying it on display unit 114; and S1404, following S1403, of receiving a password input operation from the user and transmitting the temporary permission password and a user ID to image forming apparatus 744. After execution of S1404, the program ends.

The program executed by image forming apparatus 744 includes: S1405, following S608 shown in FIG. 6, of receiving the temporary permission password and user ID from information processing apparatus 742; S1406, following S1405, of collating the received temporary permission password and the result of execution of password collating program 84, determining whether printing is to be permitted or not, and branching control flow depending on the result of determination; and S1407, executed if it is determined at S1406 that printing is permitted (YES), of reading the print data stored in temporary storage unit 82.

The program further includes: S1408, following S1407, of making a reference to the user ID and user-by-user function setting table 200, determining whether or not superposing of watermark is set on the print data of the received user ID, and branching control flow depending on the result of determination; S1409, executed if it is determined at S1408 that superposing of watermark is set (YES), of superposing the watermark on the print data read at S1407; and S1410, following S1409, of printing the print data. After execution of S1410, the program ends.

If it is determined at S1408 that superposing of watermark is not set (NO), control proceeds to S1410, at which the print data read at S1407 is printed, and thereafter, the program ends. The program further includes S1411, executed if it is determined at S1406 that printing is not permitted (NO), of transmitting print prohibiting information including the information that "input password is incorrect" to information processing apparatus 742 as the source of print request. After execution of S1411, control proceeds to S608 shown in FIG. 6.

—Operation—

Image forming system 730 in accordance with the seventh embodiment operates in the following manner.

In the image forming system 730 in accordance with the seventh embodiment, as in the first embodiment, whether an operation of image forming apparatus 744 is "PERMITTED" or "PROHIBITED" is set beforehand for every day of the week and every time slot. The set information is stored in available time slot management table 86, which is stored in image forming apparatus 744. Each user of image forming system 730 has a user ID allocated beforehand.

Further, in the seventh embodiment, the watermark to be superposed on the print data, and user-by-user function setting table 200, having time slots in which use of image forming apparatus 744 is permitted separate from that of available time slot management table 86 and setting as to whether watermark is to be superposed on the print data, set in advance for each user ID, are stored in advance in image forming apparatus 744.

Image forming system 730 in accordance with the seventh embodiment operates in the similar manner as in the first embodiment up to the issuance of the request by information processing apparatus 742 for temporary permission password to server 740. It is noted, however, that if it is determined at S607 that printing is not permitted, image forming apparatus 744 refers to the user ID and the user-by-user function setting table 200, and if there is any setting related to the use of image forming apparatus for each user ID, the operation follows the setting. This is different from the first embodiment. When information processing apparatus 742 transmits the request for issuance of temporary permission password, it simultaneously transmits the user ID and the print data.

Receiving a request for issuing the temporary permission password, server 740 generates the temporary permission password, and transmits the generated temporary permission password and the user ID to information processing apparatus 742 (S1401, S1402).

Information processing apparatus 742 displays the temporary permission password received from server 740 (S1403). Then, in response to a password input from the user in text box 182 on display image 180 and pressing of print continue button 184, information processing apparatus 742 transmits the temporary permission password and the user ID to image forming apparatus 744 (S1404).

Image forming apparatus 744 determines whether or not the temporary permission password received from information processing apparatus 742 is correct (S1406). If the temporary permission password is determined to be correct, image forming apparatus 744 reads the print data stored in temporary storage unit 82 (S1407). Next, with reference to the received user ID and the watermark superposing information for each user registered in advance, whether or not superposing of watermark is set is determined (S1408). If superposition of watermark is set, image forming apparatus 744 superposes the watermark on the print data read from temporary storage 82 (S1409), and prints the print data (S1410). If superposition of watermark is not set, image forming apparatus 744 prints the print data as it is. If the temporary permission password is determined to be incorrect, information that "input password is incorrect" is transmitted to information processing apparatus 742, and printing is not executed (S1411).

As described above, in the image forming system in accordance with the seventh embodiment, whether or not the watermark should be superposed is set user by user in advance and, therefore, it is possible to print during off-hours with the watermark not superposed. By such setting, for a predetermined user, print output without superposed watermark can be provided even if printing is done during off-hours.

As to the method of determining whether watermark is to be superposed or not, in addition to forming user-by-user function setting table 200 and setting the watermark information for each user ID beforehand, a method may be possible in which only the user IDs for which watermark is not superposed are registered in a separate management table in advance, and determination is made by checking whether the received user ID is included in the management table.

Eighth Embodiment

Configuration

Figure 16:
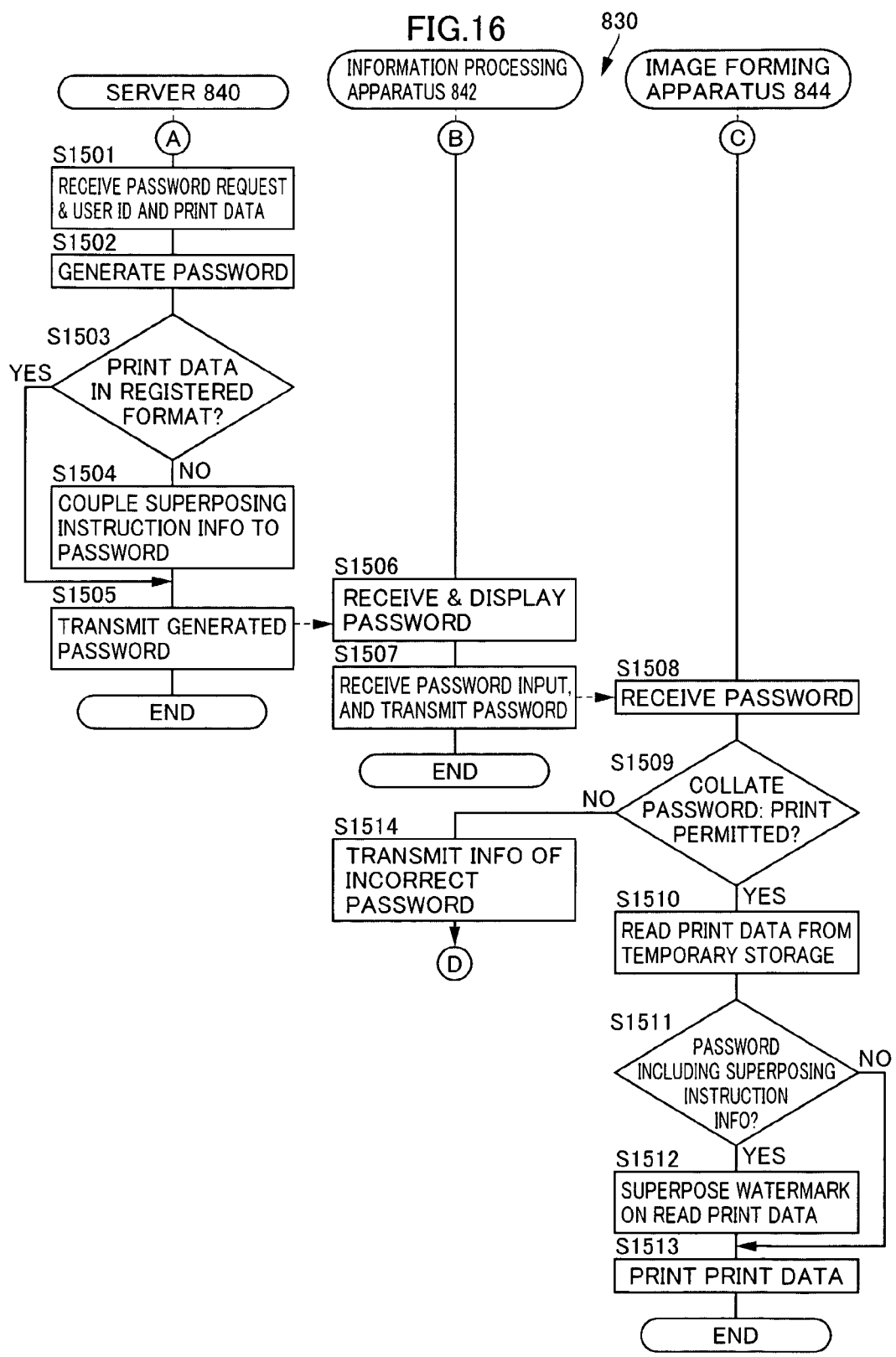
FIG. 16 shows, in the form of a flowchart, a control structure of a program executed in an image forming system 830 in accordance with an eighth embodiment.

Referring to FIG. 16, an image forming system 830 in accordance with the eighth embodiment of the present invention will be described in the following. Image forming system 830 includes a server 840, an information processing apparatus 842 and an image forming apparatus 844. The hardware configuration of these are the same as that of server 40, information processing apparatus 42 and image forming apparatus 44 of the first embodiment and, therefore, description thereof will not be repeated.

In the eighth embodiment, print format or formats used for business operations are registered in advance in server 840. Further, the watermark to be superposed on the print data is registered in advance in image forming apparatus 844.

FIG. 16 represents programs executed by central processing unit 142 of server 840, central processing unit 102 of information processing apparatus 842 and controller 60 of image forming apparatus 844 in image forming system 830 in accordance with the eighth embodiment. In FIG. 16, the processes up to connectors A, B and C are the same as S601 to S611 of the programs executed in the flow of FIG. 6.

Referring to FIG. 16, the program executed by server 840 includes: S1501 of receiving a temporary permission password request, a user ID and print data from information processing apparatus 842; S1502 following S1501, of generating the temporary permission password; S1503, following S1502, of analyzing the received print data, determining whether or not the print data is in accordance with the format registered in server 840 in advance and branching control flow depending on the result of determination; S1505, executed if it is determined at S1503 that the print data is in accordance with the format registered in advance (YES), of transmitting the generated temporary permission password to information processing apparatus 842; and S1504, executed if it is determined at S1503 that the print data is not in accordance with the format registered in advance (NO), of coupling information instructing watermark superposition to the temporary permission password generated at S1502, and let the control proceed to S1505. After execution of S1505, the program ends.

The program executed by information processing apparatus 842 includes: S1506, following S611 shown in FIG. 6, of receiving the temporary permission password from server 840, and displaying it on display unit 114; and S1507, following S1506, of receiving a password input operation from the user and transmitting the temporary permission password to image forming apparatus 844. After execution of S1507, the program ends.

The program executed by image forming apparatus 844 includes: S1508, following S608 shown in FIG. 6, of receiving the temporary permission password from information processing apparatus 842; S1509, following S1508, of collating the received temporary permission password and the result of execution of password collating program 84, determining whether printing is to be permitted or not, and branching control flow depending on the result of determination; S1510, executed if it is determined at S1509 that printing is permitted (YES), of reading the print data stored in temporary storage unit 82; S1511, following S1510, of analyzing the received temporary permission password, determining whether or not the information instructing watermark superposition is included, and branching control flow depending on the result of determination; S1512, executed if it is determined at S1511 that the superposing instruction information is included (YES), of superposing the watermark on the read print data; and S1513, following S1512, of executing printing of the print data. After execution of S1513, the program ends. If it is determined at S1511 that the superposing instruction information is not included (NO), control proceeds to S1513, at which the print data read at S1510 is printed, and after execution of S1513, the program ends.

The program further includes S1514, executed if it is determined at S1509 that printing is not permitted (NO), of transmitting print prohibiting information including the information that "input password is incorrect" to information processing apparatus 842 as the source of print request. After execution of S1514, control proceeds to S608 shown in FIG. 6.

—Operation—

Image forming system 830 in accordance with the eighth embodiment operates in the following manner.

In the image forming system 830 in accordance with the eighth embodiment, as in the first embodiment, whether an operation of image forming apparatus 844 is "PERMITTED" or "PROHIBITED" is set beforehand for every day of the week and every time slot. The set information is stored in available time slot management table 86, which is stored in image forming apparatus 844. Each user of image forming system 830 has a user ID allocated beforehand.

Further, in the eighth embodiment, a print format or formats used for business operations are registered in advance in server 840. Further, the watermark to be superposed on the print data is registered in advance in image forming apparatus 844.

Server 840 analyzes the print data received from information processing apparatus 842, and if it does not match any registered format, it couples information instructing watermark superposition to the temporary permission password to be issued. Receiving the temporary permission password having the superposition instruction information coupled thereto, image forming apparatus 844 superposes the watermark on the print data and prints the result.

Image forming system 830 in accordance with the eighth embodiment operates in the similar manner as in the first embodiment up to the issuance of the request by information processing apparatus 842 for temporary permission password to server 840. When information processing apparatus 842 transmits the request for issuance of temporary permission password, it simultaneously transmits the user ID and the print data.

Receiving the request for issuance of temporary permission password, server 840 issues the password (S1501, S1502). Server 840 analyzes the received print data, and determines whether it is in a format registered in advance (S1503). If the print data is in the registered format, server 840 directly transmits the issued temporary permission password to information processing apparatus 842 (S1505). If the print data is not in the registered format, server 840 couples the superposition instruction information to the temporary permission password to have the watermark superposed on the print data (S1504), and transmits it to information processing apparatus 842.

Information processing apparatus 842 displays the temporary permission password received from server 840 (S1506). Then, in response to a password input from the user in text box 182 on display image 180 and pressing of print continue button 184, information processing apparatus 842 transmits the temporary permission password to image forming apparatus 844 (S1507).

Image forming apparatus 844 determines whether or not the temporary permission password received from information processing apparatus 842 is correct (S1509). If the temporary permission password is determined to be correct, image forming apparatus 844 reads the print data stored in temporary storage unit 82 (S1510). Image forming apparatus 844 analyzes the received temporary permission password and determines whether it includes the superposition instruction information or not (S1511). If the superposition instruction information is included, image forming apparatus 844 performs an operation of superposing the watermark on the read print data (S1512), and prints the print data. If the superposition instruction information is not included, image forming apparatus 844 prints the read print data as it is. If the temporary permission password is determined to be incorrect, information that "input password is incorrect" is transmitted to information processing apparatus 842, and printing is not executed (S1514).

As described above, in the image forming system in accordance with the eighth embodiment, a print format used in business operations is registered in server 840 in advance, and if the transmitted print data is different from the format, the superposition instruction information is coupled to the password formed by server 840. If it is confirmed by image forming apparatus 844 that the password includes the superposition instruction information, a watermark registered in advance is superposed on the print data. By this control, if one tries to print data not in the registered print format before or after the set available hours, the watermark is superposed on the print data. As a result, printing of private data having a format different from predetermined format can be prevented.

Ninth Embodiment

Configuration

Figure 17:
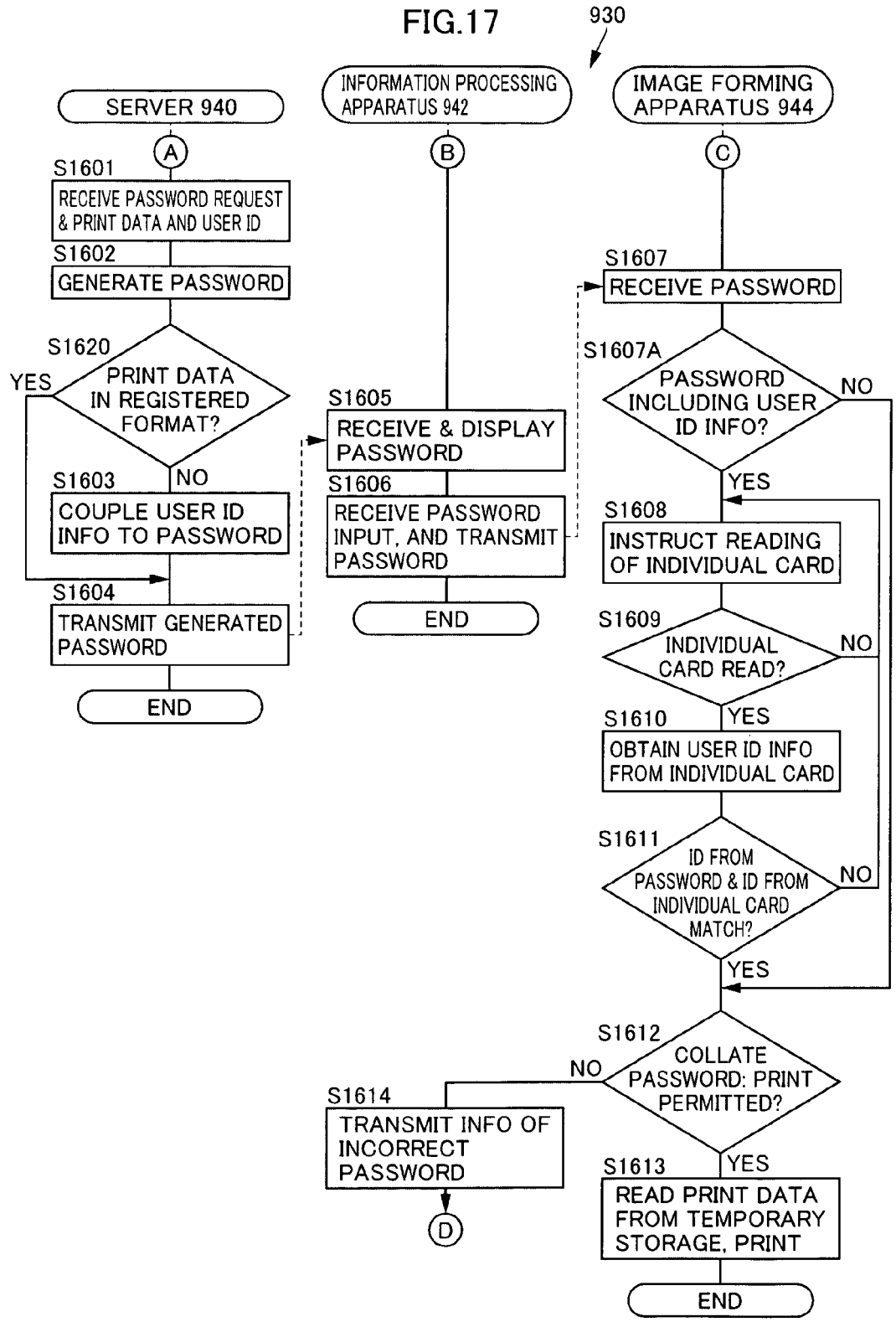
FIG. 17 shows, in the form of a flowchart, a control structure of a program executed in an image forming system 930 in accordance with a ninth embodiment.

Referring to FIG. 17, an image forming system 930 in accordance with the ninth embodiment of the present invention will be described in the following. Image forming system 930 includes a server 940, an information processing apparatus 942 and an image forming apparatus 944. The hardware configuration of these are the same as that of server 40, information processing apparatus 42 and image forming apparatus 44 of the first embodiment and, therefore, description thereof will not be repeated.

In the ninth embodiment, print format or formats used for business operations are registered in advance in server 940. Further, in the ninth embodiment, an individual card storing a user ID allocated to each user, is used.

FIG. 17 represents programs executed by central processing unit 142 of server 940, central processing unit 102 of information processing apparatus 942 and controller 60 of image forming apparatus 944 in image forming system 930 in accordance with the ninth embodiment. In FIG. 17, the processes up to connectors A, B and C are the same as S601 to S611 of the programs executed in the flow of FIG. 6.

Referring to FIG. 17, the program executed by server 940 includes: S1601 of receiving a temporary permission password request, a user ID and print data from information processing apparatus 942; S1602 following S1601, of generating the temporary permission password; S1620, following S1602, of analyzing the received print data, determining whether or not the print data is in accordance with the format registered in server 940 in advance and branching control flow depending on the result of determination; S1603, executed if it is determined at S1620 that the print data is not in the format registered in advance (NO), of coupling the received ID information to the temporary permission password; and S1604, following S1603, of transmitting the generated temporary permission password to information processing apparatus 942. If it is determined at S1620 that the print data is in the format registered in advance (YES), control proceeds to S1604. After execution of S1604, the program ends.

The program executed by information processing apparatus 942 includes: S1605, following S611 shown in FIG. 6, of receiving the temporary permission password from server 940, and displaying it on display unit 114; and S1606, following S1605, of receiving a password input operation from the user and transmitting the temporary permission password to image forming apparatus 944. After execution of S1606, the program ends.

The program executed by image forming apparatus 944 includes: S1607, following S608 shown in FIG. 6, of receiving the temporary permission password from information processing apparatus 942; S1607A, following S1607, of determining whether the received temporary permission password includes the user ID information, and branching control flow in accordance with the result of determination; S1608, executed if it is determined at S1607A that the user ID information is included (YES), of displaying a message on display unit 70, urging reading of the information on the individual card by a storage medium reading unit 90; S1609, following S1608, of determining whether the information of individual card has been read by storage medium reading unit 90, and branching control flow depending on the result of determination; S1610, executed if it is determined at S1609 that the information of individual card has been read (YES), of obtaining the user ID information from the individual card; and S1611, following S1610, of determining whether the user ID information extracted from the received temporary permission password matches the user ID information obtained from the individual card, and branching control flow depending on the result of determination.

The program further includes: S1612, executed if it is determined at S1611 that the user ID information extracted from the received temporary permission password matches the user ID information obtained from the individual card (YES), of collating the received temporary permission password and the result of execution of password collating program 84 to determine whether printing is to be permitted or not, and branching control flow depending on the result of determination; and S1613, executed if it is determined at S1612 that printing is permitted (YES), of reading the print data stored in temporary storage unit 82 and printing. If it is determined at S1607A that the user information is not included (NO), control proceeds to S1612. After execution of S1613, the program ends. If it is determined at S1609 that the individual card is not read (NO), control proceeds to S1608. If it is determined at S1611 that the user ID information extracted from the received temporary permission password does not match the user ID information obtained from the individual card (NO), control proceeds to S1608.

The program further includes S1614, executed if it is determined at S1612 that printing is not permitted (NO), of transmitting print prohibiting information including the information that "input password is incorrect" to information processing apparatus 942 as the source of print request. After execution of S1614, control proceeds to S608 shown in FIG. 6.

Operation—

Image forming system 930 in accordance with the ninth embodiment operates in the following manner.

In the image forming system 930 in accordance with the ninth embodiment, as in the first embodiment, whether an operation of image forming apparatus 944 is "PERMITTED" or "PROHIBITED" is set beforehand for every day of the week and every time slot. The set information is stored in available time slot management table 86, which is stored in image forming apparatus 944. Each user of image forming system 930 has a user ID allocated beforehand.

In the ninth embodiment, a print format or formats used for business operations are registered in advance in server 940. Server 940 analyzes the print data received from information processing apparatus 942, and if it matches the registered format, directly transmits the temporary permission password. If the print data is not registered, it transmits the temporary permission password with the user ID information added.

Further, in the ninth embodiment, an individual card storing user ID information allocated to each user is handed out to the user. The user has the individual card read by storage medium reading unit 90 upon request by image forming apparatus 944, to enable operation of image forming apparatus 944.

Image forming system 930 in accordance with the ninth embodiment operates in the similar manner as in the first embodiment up to the issuance of the request by information processing apparatus 942 for temporary permission password to server 940. When information processing apparatus 942 transmits the request for issuance of temporary permission password, it transmits the user ID and the print data.

Receiving the request for issuance of temporary permission password, server 940 issues the password (S1601, S1602). Server 940 analyzes the received print data, and determines whether it is in a format registered in advance (S1620). If the print data is in the registered format, server 940 directly transmits the issued temporary permission password to information processing apparatus 942 (S1604). If the print data is not in the registered format, server 940 couples the received user ID information to the issued temporary permission password (S1603), and transmits the password to information processing apparatus 942.

Information processing apparatus 942 displays the temporary permission password received from server 940 (S1605).

Then, in response to a password input from the user in text box 182 on display image 180 and pressing of print continue button 184, information processing apparatus 942 transmits the temporary permission password to image forming apparatus 944 (S1606).

Image forming apparatus 944 receives the temporary permission password from information processing apparatus 942 (S1607), and determines whether the temporary permission password includes the user ID information (S1607A). If the temporary permission password includes the user ID information, image forming apparatus 944 displays a message urging the user to have the individual card read by storage medium reading unit 90 (S1608). If the storage medium reading unit 90 reads the information of individual card (S1610), image forming apparatus 944 determines whether or not the user ID information extracted from the received temporary permission password matches the user ID information stored in the individual card (S1611). If both user IDs match, or if the user ID information is not included in the temporary permission password, the image forming apparatus 944 determines whether or not the received temporary permission password is correct (S1612). If the temporary permission password is determined to be correct, image forming apparatus 944 reads and prints the print data stored in temporary storage unit 82 (S1613). If the temporary permission password is determined to be incorrect, information that "the input password is incorrect" is transmitted to information processing apparatus 942, and printing is not executed (S1614). If the user ID information extracted from the received temporary permission password does not match the user ID information stored in the individual card, image forming apparatus 944 again displays a message urging the user to have the individual card read, and printing is not executed.

As described above, in the image forming system in accordance with the ninth embodiment, if the format registered in advance in server 940 does not match the received print data, user ID information is added to the issued temporary permission password. By comparing the user ID information included in the temporary permission password and the user ID information read from the individual card, operation of image forming apparatus 944 is controlled. In the image forming system, the user ID transmitted by information processing apparatus 942 to server 940 is the ID input at the time of log-on to the terminal, and it is possible that a person other than the logged-on user abuses the image forming apparatus. Therefore, in order to confirm that the person who logged-on to the terminal is the same as the person actually operating the apparatus, operation control using the individual card storing the user ID is very effective. The operation control prevents private printing not in the registered format and, in addition, it prevents "spoofing" or an operation of a terminal using user ID of other people. Therefore, this approach is also effective from the security viewpoint.

Tenth Embodiment

Configuration

Referring to FIG. 18, an image forming system 1030 in accordance with the tenth embodiment of the present invention will be described in the following. Image forming system 1030 includes a server 1040, an information processing apparatus 1042 and an image forming apparatus 1044. The hardware configuration of these are the same as that of server 40, information processing apparatus 42 and image forming apparatus 44 of the first embodiment and, therefore, description thereof will not be repeated.

In the tenth embodiment, print format or formats used for business operations are registered in advance in server 1040. Further, for a print instruction made in a time slot in which printing is prohibited, the number of sheets (N) on which printing is permitted is set in advance, and registered in image forming apparatus 1044.

FIG. 18 represents programs executed by central processing unit 142 of server 1040, central processing unit 102 of information processing apparatus 1042 and controller 60 of image forming apparatus 1044 in image forming system 1030 in accordance with the tenth embodiment. In FIG. 18, the processes up to connectors A, B and C are the same as S601 to S611 of the programs executed in the flow of FIG. 6. Further, the program shown in FIG. 18 includes the same process as included in the program shown in FIG. 16. Therefore, in FIG. 18, the same process step as that shown in FIG. 16 is denoted by the same reference characters and description thereof will not be repeated.

Referring to FIG. 18, the program executed by server 1040 further includes: S1810, executed if it is determined at S1503 that the print data is not in the format registered in advance (NO), of performing the charging process in accordance with the print data information (number of printing, and type of printing, that is, black-and-white or color), to the received user ID; and S1811, following S1810, of coupling a print number restricting instruction to the temporary permission password generated at S1502, and causing the control flow to proceed to S1505. If it is determined at S1503 that the print data is in the format registered in advance (YES), control proceeds to S1505. After execution of S1505, the program ends.

The program executed by image forming apparatus 1044 includes: S1820, following S1510, of analyzing the received temporary permission password, determining whether or not the print number restricting instruction is included, and branching control flow depending on the result of determination; S1821, executed if it is determined at S1820 that the print number restricting instruction is included (YES), of printing the read print data only on the set number of sheets (N sheets); and S1822, executed if it is determined at S1820 that the print number restricting instruction is not included (NO), of printing the read data. After execution of S1821 or after execution of S1822, the program ends.

Operation—

Image forming system 1030 in accordance with the tenth embodiment operates in the following manner.

In the image forming system 1030 in accordance with the tenth embodiment, as in the first embodiment, whether an operation of image forming apparatus 1044 is "PERMITTED" or "PROHIBITED" is set beforehand for every day of the week and every time slot. The set information is stored in available time slot management table 86, which is stored in image forming apparatus 1044. Each user of image forming system 1030 has a user ID allocated beforehand.

In the tenth embodiment, a print format or formats used for business operations are registered in advance in server 1040. Further, for a print instruction made in a time slot in which printing is prohibited, the number of sheets (N) on which printing is permitted is set in advance, and registered in image forming apparatus 1044.

Server 1040 analyzes the print data received from information processing apparatus 1042, and if it does not match the registered format, performs the charging process on the user in accordance with the print data information. The print number restricting instruction allowing printing on only a preset number of sheets is added to the temporary permission password. Receiving the temporary permission password having the print number restricting instruction, image forming apparatus 1044 prints the print data only on the set number of sheets.

Image forming system 1030 in accordance with the tenth embodiment operates in the similar manner as in the first embodiment up to the issuance of the request by information processing apparatus 1042 for temporary permission password to server 1040. When information processing apparatus 1042 transmits the request for issuance of temporary permission password, it simultaneously transmits the user ID and the print data.

Receiving the request for issuance of temporary permission password, server 1040 issues the password (S1501, S1502). Server 1040 analyzes the received print data, and determines whether it is in a format registered in advance (S1503). If the print data is in the registered format, server 1040 directly transmits the issued temporary permission password to information processing apparatus 1042 (S1505). If the print data is not in the registered format, server 1040 performs the charging process in accordance with the print data information (S1810). After the charging process, server 1040 couples the print number restricting instruction to the temporary permission password to restrict the number of printing, and transmits it to information processing apparatus 1042 (S1811).

Information processing apparatus 1042 displays the temporary permission password received from server 1040 (S1506). Then, in response to a password input from the user in text box 182 on display image 180 and pressing of print continue button 184, information processing apparatus 1042 transmits the temporary permission password to image forming apparatus 1044 (S1507).

Image forming apparatus 1044 determines whether or not the temporary permission password received from information processing apparatus 1042 is correct (S1509). If the temporary permission password is determined to be correct, image forming apparatus 1044 reads the print data stored in temporary storage unit 82 (S1510). Image forming apparatus 1044 analyzes the received temporary permission password and determines whether it includes the print number restricting instruction (S1820). If the print number restricting instruction is included, image forming apparatus 1044 prints the read print data only on the permitted number of sheets (N) (S1821). If the print number restricting instruction is not included, image forming apparatus 1044 prints the read print data as it is (S1822). If the temporary permission password is determined to be incorrect, image forming apparatus 1044 transmits information that "input password is incorrect" to information processing apparatus 1042, and printing is not executed (S1514).

As described above, in the image forming system in accordance with the tenth embodiment, print format or formats used for business operations are registered in advance in server 1040, and if the print data is other than the registered formats, a charging process is performed for the user. Further, even after the charging process, printing is possible only to the preset number. As the printing is restricted in this manner, it is possible to prevent printing of private data containing a large number of pages during off-hours. As a result, consumption of print supplies caused by private use can be prevented.

As described above, by each of the embodiments described as examples, an image forming system that can prevent private use without negatively affecting business operations related to use of the image forming system can be provided.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming system, comprising:
a data receiving unit for receiving data to be printed and an identifier of a user demanding printing of the data;
a first determining unit for determining whether or not a document represented by the data received by said data receiving unit is in accordance with a predetermined format; and
a print controller for permitting or restricting printing of said data, depending on the result of determination by said first determining unit;
wherein
said predetermined format is neither a color data format nor a monochrome data format but a print format used for business operations, and
wherein
said print controller includes
a print permitting unit for permitting, if it is determined by said first determining unit that said data is in accordance with said predetermined format, printing of said data, and
a charging unit for charging, if it is determined by said first determining unit that said data is not in accordance with said predetermined format, a prescribed fee to a user corresponding to said identifier, for printing said data.

2. The image forming system according to claim 1,
further comprising
a report forming unit, responsive to a determination by said first determining unit that the document represented by said data is not in accordance with said format, for forming a print result report including a thumbnail of the document represented by said data.

3. An image forming system, comprising:
a data receiving unit for receiving data to be printed and an identifier of a user demanding printing of the data;
a first determining unit for determining whether or not a document represented by the data received by said data receiving unit is in accordance with a predetermined format;
a print controller for permitting or restricting printing of said data, depending on the result of determination by said first determining unit; and
a reading unit for reading user identification information from an external storage medium storing the user identification information;
wherein
said print controller includes
a permitting unit for permitting, if it is determined by said first determining unit that said data is in accordance with said predetermined format, printing of said data,
an information reading unit, responsive to a determination by said first determining unit that the document represented by said data is not in accordance with said predetermined format, for reading the user identification information using said reading unit, and
an operation controller for permitting or restricting printing of said data depending on whether the identification information read by said information reading unit and the identifier of the user who demanded printing of said data satisfy a prescribed relation or not; and wherein
said predetermined format is neither a color data format nor a monochrome data format but a print format used for business operations.

4. An image forming system, comprising:
a data receiving unit for receiving data to be printed and an identifier of a user demanding printing of the data;
a first determining unit for determining whether or not a document represented by the data received by said data receiving unit is in accordance with a predetermined format;
a print controller for permitting or restricting printing of said data, depending on the result of determination by said first determining unit; and
a second determining unit for determining, for each user, whether printing in only a first number of colors is permitted, or printing in said first number of colors and in a second number of colors larger than said first number of colors are both permitted;
wherein
said print controller includes
a print permitting unit for permitting, if it is determined by said first determining unit that said data is in accordance with said predetermined format, printing of said data, and
a print color controller for permitting, if it is determined by said first determining unit that said data is not in accordance with said predetermined format, printing said data within the number of colors in accordance with the result of determination by said second determining unit; and
wherein
said predetermined format is neither a color data format nor a monochrome data format but a print format used for business operations.

5. An image forming system, comprising:
a data receiving unit for receiving data to be printed and an identifier of a user demanding printing of the data;
a first determining unit for determining whether or not a document represented by the data received by said data receiving unit is in accordance with a predetermined format;
a print controller for permitting or restricting printing of said data, depending on the result of determination by said first determining unit; and
a storage unit storing a print management table storing information specifying a time slot for permitting printing;
wherein
said print controller includes
a second determining unit for determining whether or not time at which printing of said data is demanded is within said time slot recorded in said print management table; and
a print time controller for permitting or restricting printing of said data depending on a combination of the result of determination by said first determining unit and the result of determination by said second determining unit; and
wherein
said predetermined format is neither a color data format nor a monochrome data format but a print format used for business operations.

6. The image forming system according to claim 5, wherein
said print management table records, user by user, time conditions for permitting printing; and
said second determining unit includes a user-by-user time controller for determining whether or not the time at which printing of said data is demanded matches time conditions recorded in said print management table in correspondence with the identifier of the user who demanded printing of the data.

7. The image forming system in accordance with claim 6, wherein
said print management table further records, user by user, an instruction as to whether a prescribed change is to be made on a print image, if said time condition recorded for the user is not satisfied; and
said print time controller includes a printer for permitting printing of said data, or for printing said data after making a change in accordance with an instruction recorded in said print management table in correspondence with an identifier of the user who demanded printing of said data, depending on a combination of the result of determination by said first determining unit and the result of determination by said second determining unit.

8. The image forming system according to claim 7, wherein
a change is a process of superimposing a visible image prepared in advance on said data.

9. The image forming system according to claim 8, wherein
a visible image is an image including a character sequence indicating that it is before or after print available time slot.

10. A method of restricting use of an image forming system implemented by a computer, comprising:
a data receiving step of receiving data to be printed and an identifier of a user demanding printing of the data;
a first determining step of determining whether or not a document represented by said data received by said data receiving unit is in accordance with a predetermined format; and
the print control step permitting or restricting printing of said data, depending on the result of determination at said first determining step;
wherein
said print control step includes
the print permitting step of permitting, if it is determined at said first determining step that said data is in accordance with said predetermined format, printing of said data, and
the charging step of charging, if it is determined by said first determining step that said data is not in accordance with said predetermined format, a prescribed fee to a user corresponding to said identifier, for printing said data; and
wherein
said predetermined format is neither a color data format nor a monochrome data format but a print format used for business operations.

11. A method of restricting use of an image forming system implemented by a computer, comprising:
a data receiving step of receiving data to be printed and an identifier of a user demanding printing of the data;
a first determining step of determining whether or not a document represented by said data received by said data receiving unit is in accordance with a predetermined format;
the print control step permitting or restricting printing of said data, depending on the result of determination at said first determining step; and
the storage step of storing a print management table storing information specifying a time slot for permitting printing;

wherein said print controlling step includes the second determining step of determining whether or not time at which printing of said data is demanded is within said time slot recorded in said print management table, and the print time controlling step of permitting or restricting printing of said data depending on a combination of the result of determination by said first determining unit and the result of determination by said second determining unit, and wherein said predetermined format is neither a color data format nor a monochrome data format but a print format used for business operations.

* * * * *